(12) United States Patent
Puttick et al.

(10) Patent No.: US 8,095,434 B1
(45) Date of Patent: Jan. 10, 2012

(54) AUTOMATICALLY PERFORMING VARYING LEVELS OF SUMMARIZATION OF GEOGRAPHIC DATA POINTS IN RESPONSE TO A USER'S SELECTION OF ZOOM LEVEL

(75) Inventors: Randy W. Puttick, Mercer Island, WA (US); William M. Lewis, Seattle, WA (US); John K. Burroughs, Seattle, WA (US); Hauke A. Gentzkow, Seattle, WA (US); Steven F. Stein, Mill Creek, WA (US)

(73) Assignee: Zillow, Inc., Seattle, WA (US)

( * ) Notice: Subject to any disclaimer, the term of this patent is extended or adjusted under 35 U.S.C. 154(b) by 408 days.

(21) Appl. No.: 12/031,436

(22) Filed: Feb. 14, 2008

Related U.S. Application Data

(60) Provisional application No. 61/014,346, filed on Dec. 17, 2007.

(51) Int. Cl.
*G06Q 30/00* (2006.01)
(52) U.S. Cl. .................. 705/26.9; 705/27.1
(58) Field of Classification Search ............... 705/26, 705/27
See application file for complete search history.

(56) References Cited

U.S. PATENT DOCUMENTS

| | | | |
|---|---|---|---|
| 6,778,193 | B2 | 8/2004 | Biebesheimer et al. |
| 7,237,187 | B2 | 6/2007 | Neal et al. |
| 7,734,566 | B2 | 6/2010 | Caracas et al. |
| 2003/0101063 | A1* | 5/2003 | Sexton et al. .............. 705/1 |
| 2005/0288957 | A1 | 12/2005 | Eraker et al. |
| 2005/0288959 | A1 | 12/2005 | Eraker et al. |
| 2006/0095345 | A1 | 5/2006 | Ka et al. |
| 2006/0271280 | A1* | 11/2006 | O'Clair .............. 701/208 |
| 2008/0086451 | A1 | 4/2008 | Torres et al. |

OTHER PUBLICATIONS

HouseFront Offers Real Estate Property Info Via Cell Phone. Wireless News Jul. 18, 2007.*
Non-Final Office Action for U.S. Appl. No. 11/943,695, Mail Date Jun. 17, 2011, 14 pages.

* cited by examiner

*Primary Examiner* — Jeffrey A Smith
*Assistant Examiner* — Resha Desai
(74) *Attorney, Agent, or Firm* — Perkins Coie LLP

(57) ABSTRACT

A facility for summarizing a set of data points each having a geographic location is described. The facility specifies the display of a map showing a geographic area the specified by a user. The facility identifies a number of geographic regions in the geographic area that are of a type that is automatically selected by the facility in response to the identity of the geographic area. The map indicates, for a least one of the identified geographic regions, information that summarizes one or more aspects of the data points of the set that have geographic locations contained in the identified geographic region.

17 Claims, 24 Drawing Sheets text index 1210

| term | home id |
|---|---|
| ... | ... |
| cottage | 12 |
| cottage | 44 |
| cozy | 1 |
| cozy | 19 |
| cozy | 20 |
| cozy | 49 |
| cozy | 55 |
| cozy | 74 |
| cubbies | 22 |
| cubbies | 91 |
| ... | ... |

*FIG. 12A* geographic index 1240

| home id | latitude | longitude |
|---|---|---|
| ... | | |
| 18 | 45.145.190 | -118.534523 |
| 19 | 47.57.0777 | -122.376561 |
| 20 | 47.670820 | -122.376557 |
| 21 | 46.313240 | -119.342140 |
| 22 | 47.671180 | -122.376521 |
| ... | | |

*FIG. 12B*

| home id | For Sale | Make Me Move | Recently sold | Price | Beds | Baths | Size | Lot | Type | Sale date |
|---|---|---|---|---|---|---|---|---|---|---|
| ... | | | | | | | | | | |
| 18 | no | no | yes | $450,321 | 4 | 2 | 1,495 | 3,810 | SF | 8/11/2006 |
| 19 | yes | yes | no | $399,750 | 6 | 4 | 4,450 | 7,801 | CU | 1/14/2000 |
| 20 | no | no | no | $348,310 | 3 | 1 | 1,370 | 6,453 | SF | 10/10/1999 |
| 21 | no | no | no | $72,031 | 1 | 1 | 993 | 2,120 | SF | 6/23/1995 |
| 22 | no | yes | yes | $399,015 | 3 | 2 | 1,600 | 3,400 | SF | 6/19/2006 |
| ... | | | | | | | | | | |

| term | home id |
|------|---------|
| cozy | 1 |
| cozy | 19 |
| cozy | 20 |
| cozy | 49 |
| cozy | 59 |
| cozy | 74 |

FIG. 14B

| home id | latitude | longitude |
|---------|----------|-----------|
| 2 | 47.671123 | -122.376494 |
| 19 | 47.670777 | -122.376561 |
| 20 | 47.670820 | -122.376557 |
| 22 | 47.671180 | -122.376521 |
| 49 | 47.670980 | -122.376495 |
| 72 | 47.671024 | -122.376521 |

FIG. 14C relational constituent result

| home id | For Sale | Make Me Move | Recently sold | Price | Beds | Baths | Size | Lot | Type | Sale date |
|---------|----------|--------------|---------------|-------|------|-------|------|-----|------|-----------|
| 11 | yes | no | no | $322,000 | 2 | 2 | 1,490 | 4,110 | SF | 2/6/2003 |
| 19 | yes | yes | no | $399,750 | 6 | 4 | 4,450 | 7,801 | CU | 1/14/2000 |
| 20 | no | no | yes | $348,310 | 3 | 1 | 1,370 | 6,453 | SF | 10/10/1999 |
| 22 | no | yes | no | $399,015 | 3 | 2 | 1,600 | 3,400 | SF | 6/19/2006 |
| 49 | no | no | no | $330,000 | 3 | 2 | 1,550 | 3,895 | SF | 9/13/2003 |

AUTOMATICALLY PERFORMING VARYING LEVELS OF SUMMARIZATION OF GEOGRAPHIC DATA POINTS IN RESPONSE TO A USER'S SELECTION OF ZOOM LEVEL

RELATED APPLICATION(S)

This application claims the benefit of U.S. Provisional Patent Application No. 61/014,346, filed on Dec. 17, 2007, which is hereby incorporated by reference in its entirety.

TECHNICAL FIELD

The described technology is directed to the field of dynamic mapping techniques.

BACKGROUND

It has recently become common for web sites to display individual data points in connection with a geographic map. For example, many real estate web sites permit their users to display a map of a particular geographic region that shows the location of every home that is currently for sale. A user may click on one of these homes to obtain detailed information about the home. Similarly, some property tax jurisdictions make available web sites that show each property tax parcel on a map; a user may click on one of the parcels to see detailed information about it.

A user may typically zoom a map displayed by a web site in or out to show, respectively, a smaller or larger geographic region in the same display region on the screen. A map may also typically be panned in any direction, such that a neighboring geographic region in that direction is displayed, thus "traversing" geographic space.

BRIEF DESCRIPTION OF THE DRAWINGS

FIGS. 12A-12C are table diagrams showing a text index, a geographic index, and a relational index.

FIGS. 14A-14C show text, geographic, and relational constituent results.

FIGS. 16-20 show sample displays presented as part of the user interface.

DETAILED DESCRIPTION

Figure 1:
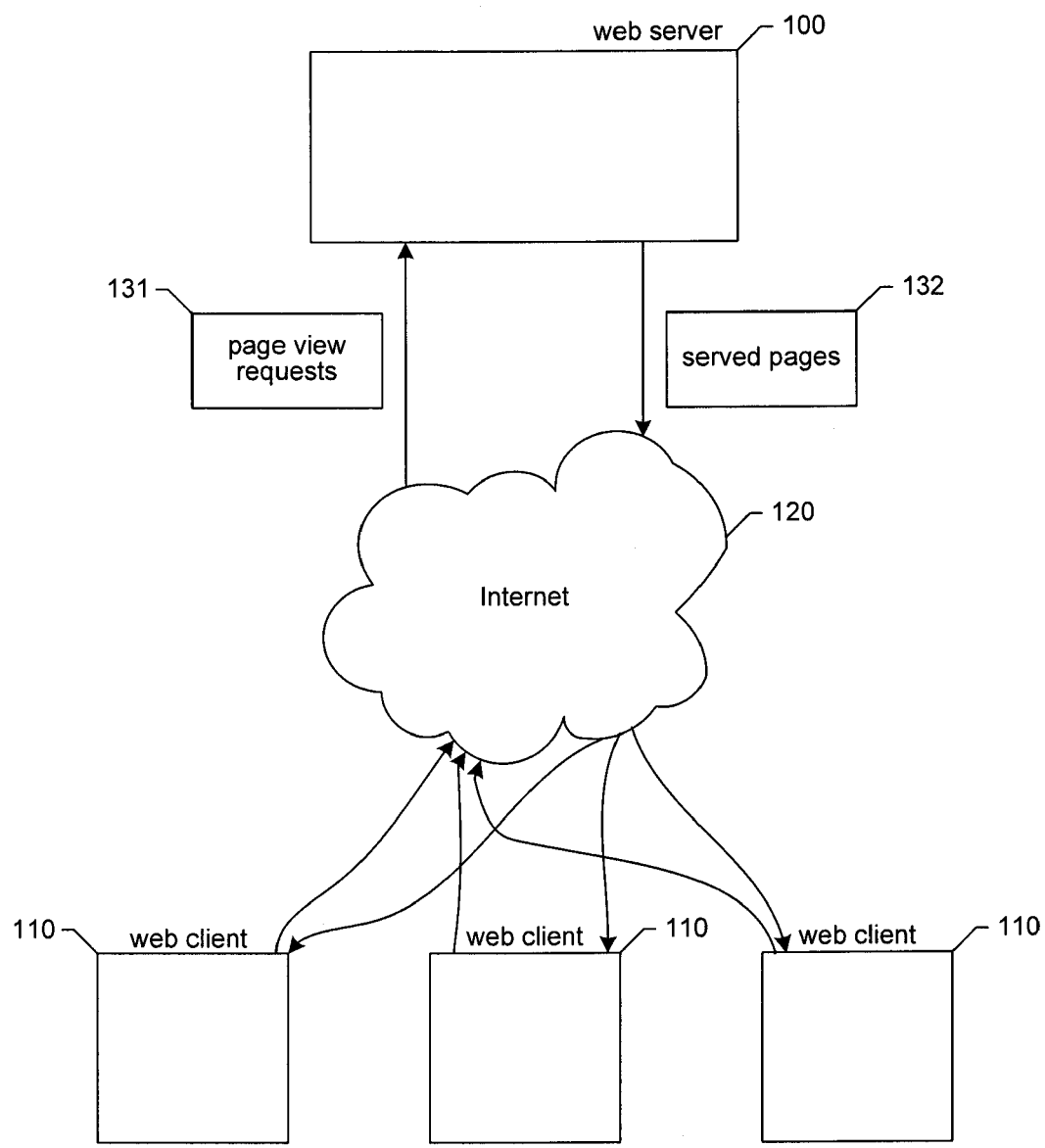
FIG. 1 is a high-level data flow diagram showing data flow within a typical arrangement of components used to provide the facility.

The inventors have recognized that conventional techniques for plotting data points on a geographic map as described above tend to be useful only at certain zoom levels, in which a tenable number of geographically-associated data points are displayed. For example, in a county containing thousands of homes, hundreds of homes may be for sale at a given time. A map zoomed to show the entire county will include a data point for each of these homes, which in most cases produces a cluttered and difficult-to-use display.

A software facility for showing information corresponding to geographically-associated data points on a map that automatically performs varying levels of summarization of this information in response to a user's selection of zoom level for the map ("the facility") is described. In some embodiments, the facility establishes a set of summarization levels, at each of which the facility can summarize information corresponding to geographically-associated data points. For example, in some embodiments, the facility uses summarization levels including country, state, county, city, neighborhood, and individual home. In various embodiments, the facility uses summarization levels corresponding to a wide variety of other types of geographic regions, including, for example, boroughs, zip codes, zip+4 codes, census tracts, subdivisions, election districts, school districts, multi-unit buildings, and/or multi-building developments.

When a user requests a map for a particular location and zoom level, the facility determines which of the summarization levels to apply. For example, for a map that is positioned to show twenty cities, each of which has data points, the facility may determine to apply the city summarization level, such that the facility summarizes, for each of the twenty cities, the data points in that city. In some embodiments, the facility makes this determination by applying a deterministic mapping from zoom level to summarization level. For example, where the mapping mechanism being used is limited to a reasonably small number of discrete zoom levels, the facility may map from each of these discrete zoom levels to one of the summarization levels. On the other hand, where the mapping mechanism being used can perform zooming in a more continuous manner, the facility may map from each of a number of adjacent ranges of continuous zoom levels to one of the summarization levels. In some embodiments, the facility determines which summarization level to apply using a population analysis technique, in which the facility establishes for each summarization level an optimal number of regions to show, and selects the summarization level where the actual number of regions shown in the displayed map is closest to the optimal level for that summarization level. For example, if the facility establishes an optimal number of cities to show for the city summarization level is 4 and the optimal number of neighborhoods to show for the neighborhood summarization level is 9, and a particular map includes 3 cities and 35 neighborhoods, the facility may determine to apply the city summarization level in view of the proximity of 3 to 4.

In various embodiments, the facility employs one or more of various forms of summarization to dynamically combine values associated with individual data points in a region into values included in a summary for that region, such as value aggregation, selection of a representative data point, multidimensional graphing, semantic summarization, or other analytical and/or visualization tools.

In some embodiments, the facility enables the user displaying the map to filter the data points that are displayed or summarized in a variety of ways, such as by specifying acceptable values or ranges of values for various attributes of the data points. For example, where each data point is a home, in some embodiments the user can specify acceptable values or ranges for attributes such as home type, listing price, selling price, current valuation, number of bedrooms, number of bathrooms, sale status, lot or home size, year of construction, view type, roof type, etc.

By automatically performing varying levels of summarization of geographic data points in response to a user's selection of zoom level for the map in some or all of the ways described above, the facility is able to provide information that is better-tailored to a wider variety of zoom levels than provided by conventional techniques.

FIG. 1 is a high-level data flow diagram showing data flow within a typical arrangement of components used to provide the facility. A number of web client computer systems 110 that are under user control generate and send page view requests 231 to a logical web server 100 via a network such as the Internet 120. Within the web server, these requests may either all be routed to a single web server computer system, or may be loaded-balanced among a number of web server computer systems. The web server typically replies to each with a served page 132.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions, cameras, etc.

Figure 2:
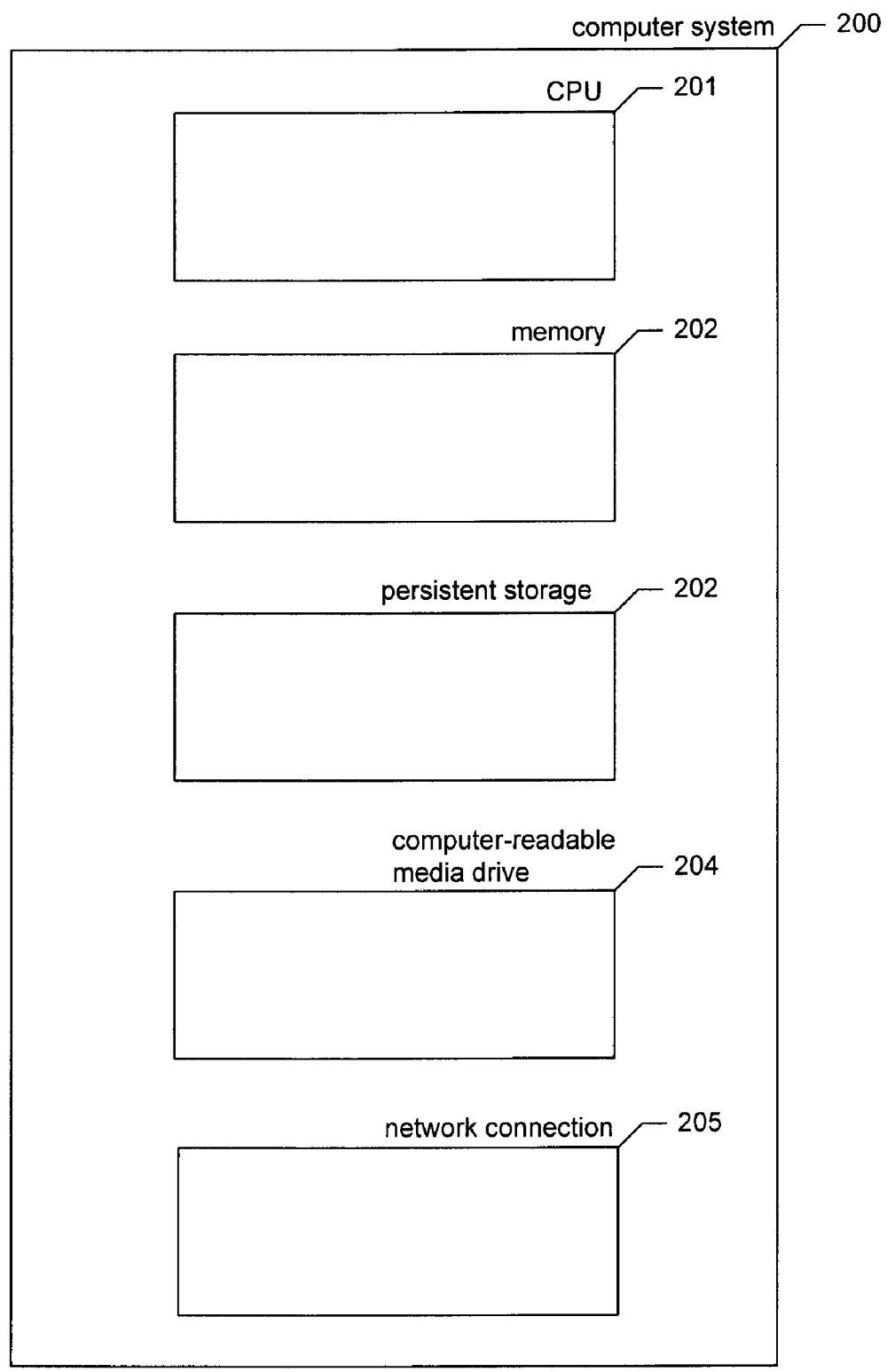
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet. While computer systems configured as described above are typically used to support the operation of the facility, those skilled in the art will appreciate that the facility may be implemented using devices of various types and configurations, and having various components.

Figure 3:
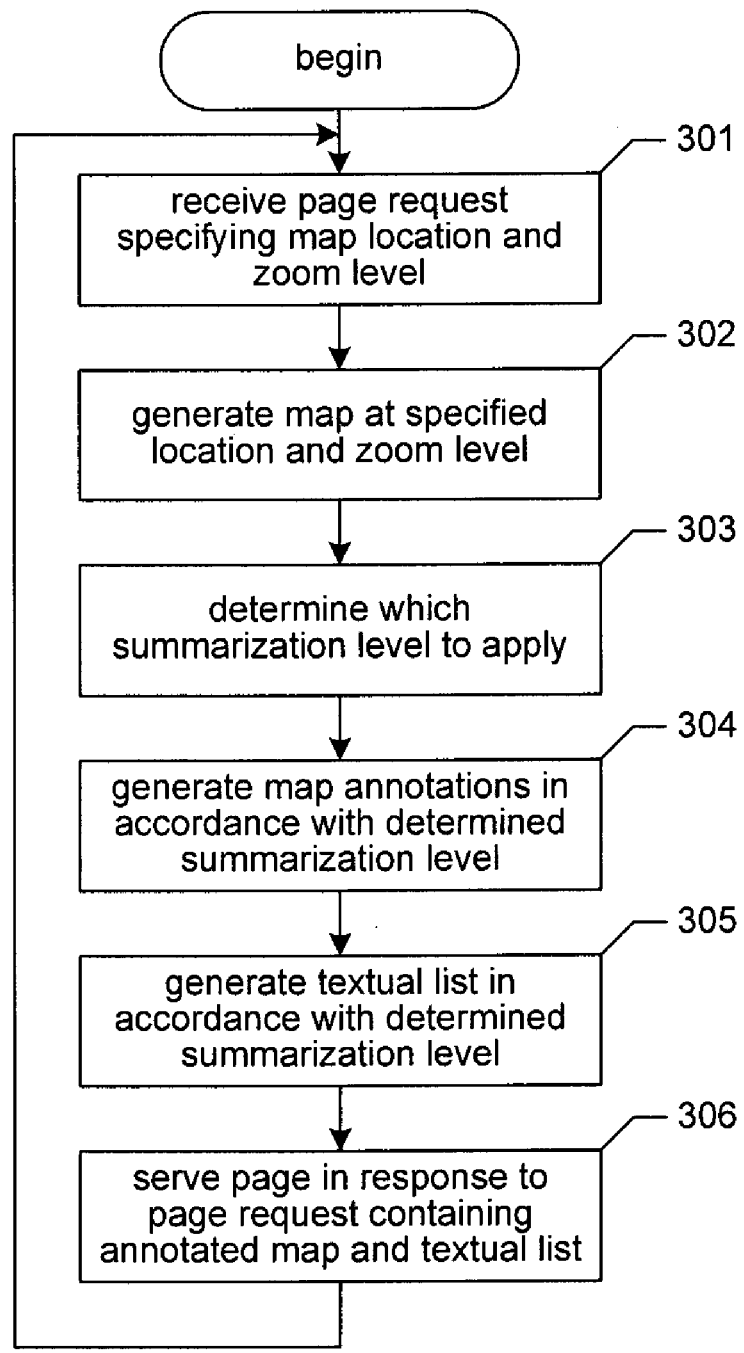
FIG. 3 is a flow diagram showing steps typically performed by the facility in order to serve a map including selective summarization.

FIG. 3 is a flow diagram showing steps typically performed by the facility in order to serve a map including selective summarization. In step 301, the facility receives a page request specifying both a map location and a zoom level. In some embodiments, some page requests specify search criteria to limit the set of data points that are displayed and/or summarized in the requested map. In step 302, the facility generates a map at the location and zoom level specified by the page request received in step 301. In step 303, the facility determines which summarization level to apply. In some embodiments, the facility makes this determination by applying a deterministic mapping from zoom level to summarization level. Table 1 below shows such a mapping, where higher zoom levels correspond to smaller geographic areas.

TABLE 1

| Zoom Level | Summarization Level |
| --- | --- |
| 1 | continent |
| 2 | country |
| 3 | state/province |
| 4 | state |
| 5 | state |
| 6 | county |
| 7 | county |
| 8 | county |
| 9 | city |
| 10 | city |
| 11 | neighborhood |
| 12 | neighborhood |
| 13 | neighborhood |
| 14 | neighborhood |
| 15 | home/building |
| 16 | home/building |
| 17 | home/building |
| 18 | home/building |

For example, at zoom level 10, the facility determines to apply the city summarization level. In some embodiments, particularly where a large number of zoom levels are possible, the facility maps ranges of zoom levels each to a summarization level.

In some embodiments, step 303 involves (1) scoring each summarization level based upon factors including the difference between (a) the actual number of geographic regions corresponding to the summarization level that appear on the map and (b) an optimal number of such geographic regions determined for the summarization level, then (2) selecting the highest score. Equation 1 below shows a formula used by the facility in some embodiments to determine a score for each summarization level.

$$\text{Score}_{summarizationlevel} = \text{preference score} + \text{most recent summarization level bonus} - \left| \log\left( \frac{\text{number of regions}}{\text{optimal number of regions}} \right) \right| \times \text{distance weight} \qquad \text{Equation 1}$$

The preference score reflects the facility's overall level of preference for using the summarization level. The most recent summarization level bonus is a positive constant value if the present summarization level is the same as the last summarization level used for the requesting user, and zero otherwise. (In some embodiments, the most recent summarization level bonus is only non-zero where the current page request represents a panning request from the user relative to the map indicated in the last page served to the user.) The number of regions is the actual number of geographic regions of the type corresponding to the summarization level that intersect the map. The optimal number of regions is a predetermined optimal number of such regions to show in a map. The distance weight reflects the significance attributed to deviations of the actual number of regions from the optimal number of regions. Table 2 below uses sample configuration data used by the facility in some embodiments as a basis for determining scores using the formula in Equation 1.

TABLE 2

| Summarization Level | Preference Score | Optimal Number | Distance Weight |
|---|---|---|---|
| continent | 1 | 5 | 20 |
| country | 2 | 4 | 8 |
| state | 4 | 5 | 5 |
| county | 6 | 6 | 2 |
| city | 10 | 4 | 2 |
| neighborhood | 16 | 9 | 2 |

For example, where the state summarization level is the summarization level most recently used for the requesting user, and the most recent summarization level bonus is established to have a value of 5, and the number of states intersecting the map is 2, the score for the state summarization level is $4+5+|\log(0.5)|\times 5=7.5$.

In some embodiments, the facility tests the determined summarization level to ensure that at least one region of the region type corresponding to the determined summarization level can be displayed on the map. In particular, in some embodiments, the facility determines whether any region of the region type corresponding to the determined summarization level intersects the area represented by the map. In some embodiments, the facility determines whether any region of the region type corresponding to the determined summarization level intersects a region near the center of the area of the map, such as the central two-thirds area of the map. If no such region intersects, in some embodiments, the facility determines to employ an alternative summarization level, such as a summarization level corresponding to zip code regions, that is relatively ubiquitous, ensuring in most cases that at least one region can be displayed on the map.

Returning to FIG. 3, in step 304, the facility generates map annotations in accordance with the summarization level determined in step 303. In some embodiments, step 304 involves: drawing all borders between regions of the determined summarization level that occur within the map; for each region of the summarization level that has a non-zero number of data points that satisfy the user's search criteria, showing some information summarized across the data points that satisfy the user's search criteria, such as number of data points in the region that satisfy the user's search criteria, average value of data points in the region that satisfy the user's search criteria, minimum or maximum value of data points within the region that satisfy the user's search criteria, etc.; and, for the regions of the summarization level having the highest number of data points that satisfy the user's search criteria, such as the top 20 regions, showing their names. In some embodiments, the facility may show the names of regions of the summarization level that do not have the highest number of data points that satisfy the user's search criteria, but are near the center of the map, and are therefore likely to be significant to the user. In some embodiments, step 304 includes adding functionality to the map that causes the borders of a region of the determined summarization level to be highlighted when the mouse cursor hovers within the region. Annotations generated by the facility in step 304 are discussed in greater detail below in connections with FIGS. 4-10.

In step 305, the facility generates a textual list of geographic regions at the determined summarization level. Again, this list shows information summarized across each of the geographic regions at the determined summarization level that, intersects the map. In step 306, the facility serves a page in response to the page request received in step 301 that contains the map generated in step 303, annotated with the annotations generated in step 304, together with the textual list generated in step 305. After step 306, the facility continues in step 301 to receive the next page request. Such a next page request may be sent, for example, when the same user zooms or pans the map returned in response to the current page request, or when the user alters the set of data points by adjusting the filtering criteria.

Those skilled in the art will appreciate that the steps shown in FIG. 3 and in each of the flow diagrams discussed below may be altered in a variety of ways. For example, the order of the steps may be rearranged; substeps may be performed in parallel; shown steps may be omitted, or other steps may be included; etc.

Figure 4:
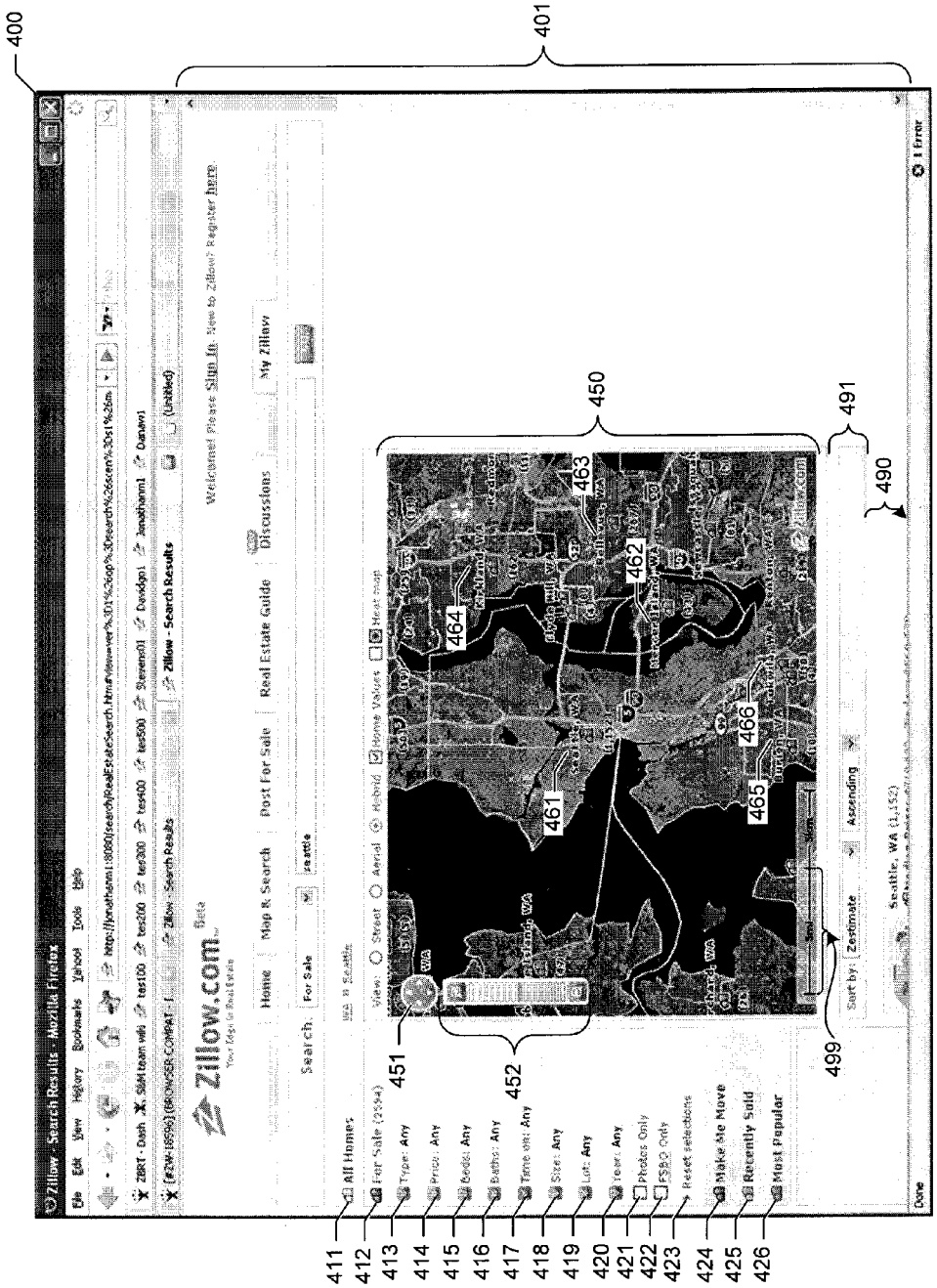
FIG. 4 is a display diagram showing a map annotated by the facility at the city summarization level.

FIGS. 4-10 are display diagrams showing sample displays that are typical of those presented by the facility. FIG. 4 is a display diagram showing a map annotated by the facility at the city summarization level. A browser window 400 includes a served web page in client area 401. The web page includes controls 411-426 that may be used by the user to filter the set of data items (here, homes) that occur in the geographic area represented by the map. It can be seen that the user has selected control 412 in order to limit the home data items in the area of the map to those that have a for sale status—in other words, those that are on the market. Control 412 contains an indication that there are 2,594 for sale homes within the area of the map. The user could remove this restriction by selecting control 411, or may modify it by selecting any of controls 424-426 to limit the results to the other categories of home data items represented by these controls. Within the presently selected for sale category, the user may also use controls 413-422 to further restrict the set of for sale homes that are included in the result set based upon various attributes of those homes. The geographic area depicted in map 450 is subject to adjustment by the user using a panning control 451 and/or a zooming control 452. Various other approaches to navigating the map, including keyboard commands, mouse wheel rotations, click-and-drag gestures, etc., may also be used to adjust the geographic area depicted in the map. It can be seen that the scale of the map is represented by scale legend 499. The map shows a number of city regions, including city regions 461-466. The borders that divide the city regions are shown as white lines, and many of the city regions, such as those numbered above, contain the name of the region, as well as an indication of the number of home data points within the region. For example, it can be seen that the Seattle, Wash. city region 461 shows both this name, and an indication that there are 1,152 home data points in this region that satisfy the user's search criteria—in this case, the status "for sale." Additionally, the page contains a list (only partially shown) 490 of each of the city regions that intersect the area of the map. The page includes controls 491 for reordering this textual list in useful ways.

Figure 5:
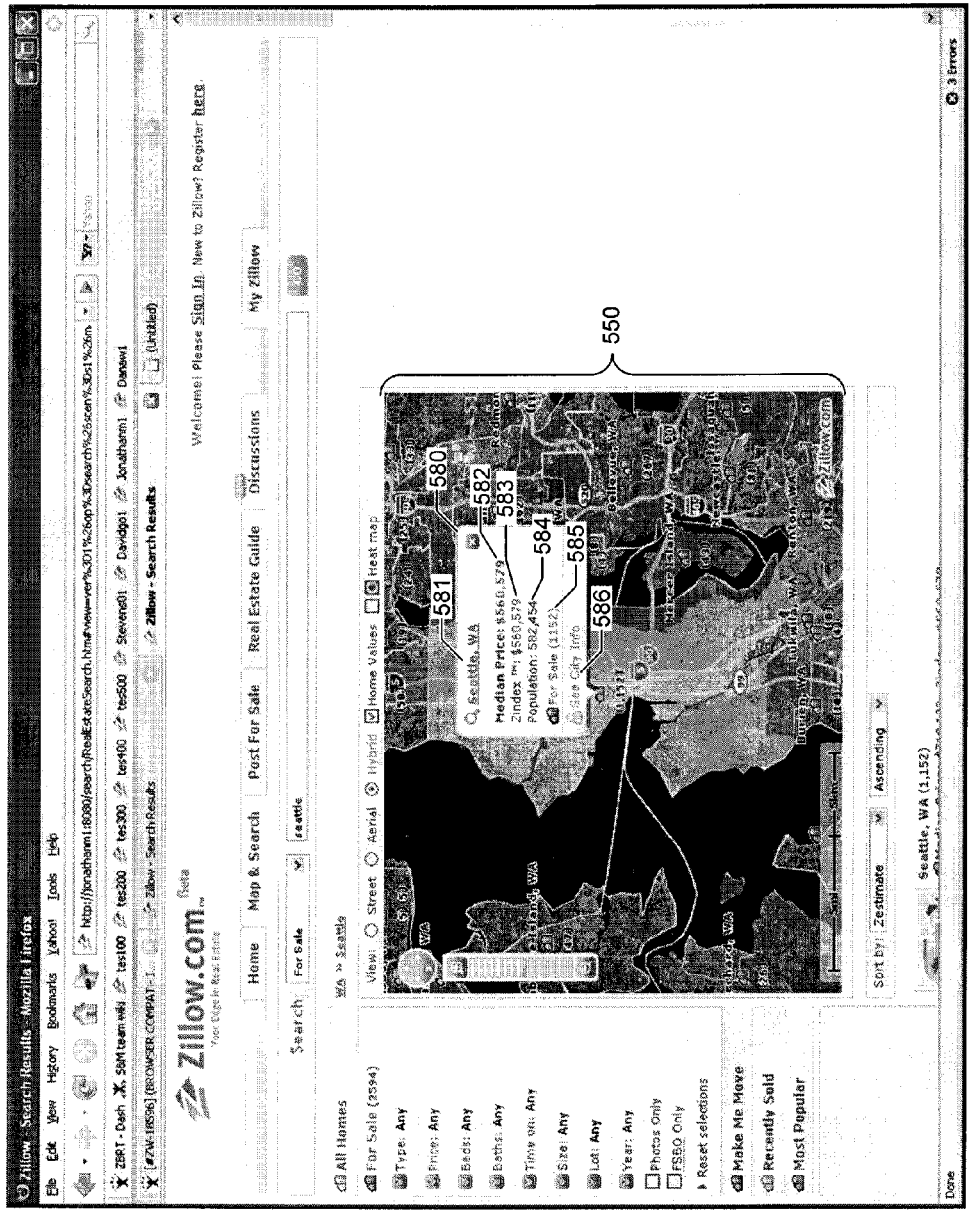
FIG. 5 is a display diagram showing a typical display generated by the facility containing additional information about the Seattle, Wash. city region.

The user may display additional information about one of the displayed regions by selecting it, such as by clicking on it or by hovering the mouse over the legend displayed for the region. FIG. 5 is a display diagram showing a typical display generated by the facility containing additional information about the Seattle, Wash. city region. Map 550 contains an information bubble 580 positioned adjacent to the map legend for the Seattle, Wash. city region that includes the following: a control 581 that the user can select to zoom the map to the Seattle city region; an indication 582 of the median listing home price among the home data items in the Seattle city region that satisfy the user's search criteria; an indication 583 of the average current valuation of these homes; an indication 584 of the total population of the Seattle city region; an indication 585 of the number of for sale homes in this region; a control 586 that the user may select in order to see a variety of information collected about this geographic region; and a control 587 that the user may select in order to close or dismiss the bubble.

Figure 6:
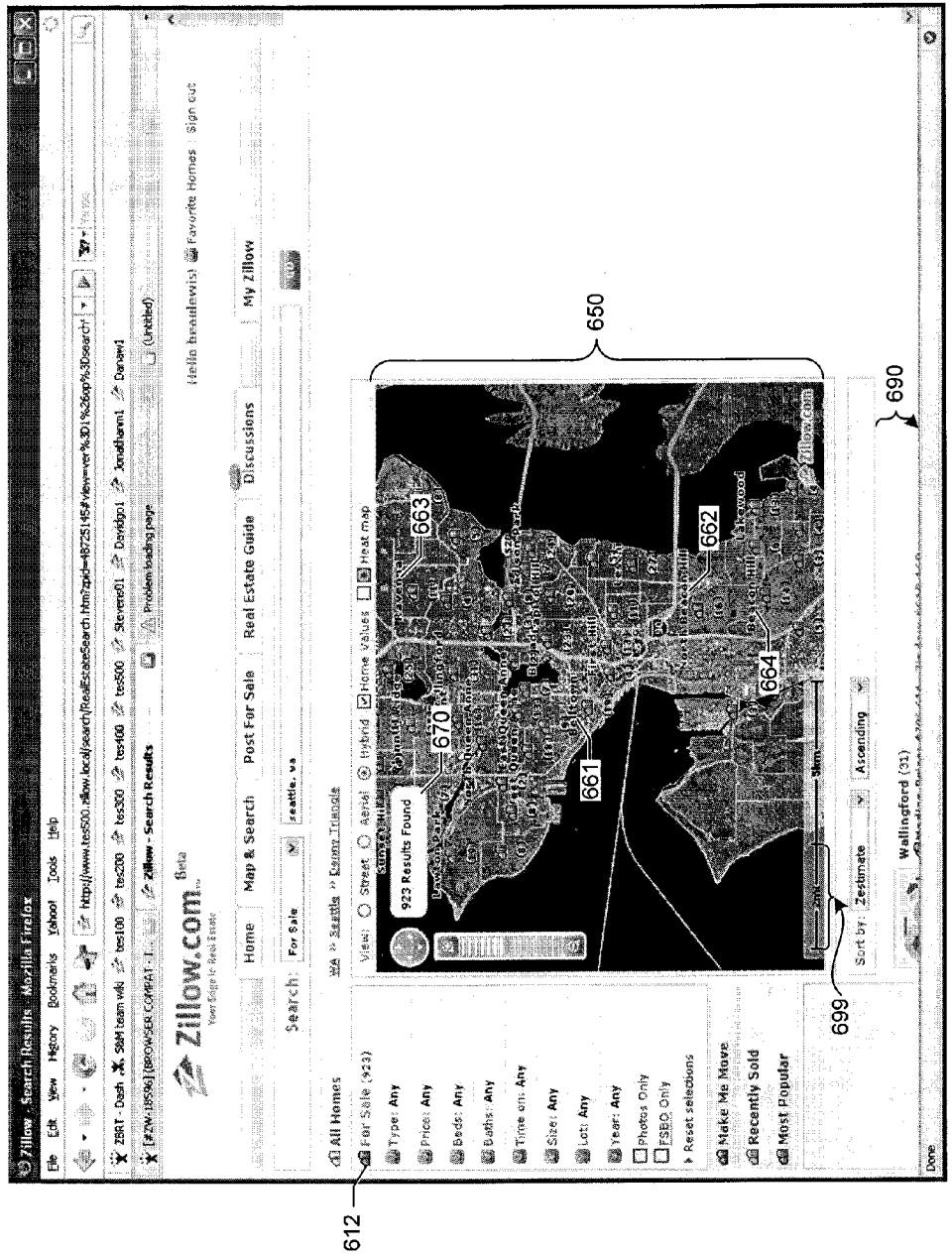
FIG. 6 is a display diagram showing a sample display of a map of the Seattle city region as annotated at the neighborhood summarization level.

FIG. 6 is a display diagram showing a sample display of a map of the Seattle city region as annotated at the neighborhood summarization level. The user can display such a map, for example, by selecting control 581 shown in FIG. 5. Map 650 corresponds to the geographic area of the Seattle city region. It can be seen by comparing scale legend 699 to scale legend 499 shown in FIG. 4 that the geographic region depicted in map 650 is smaller than the geographic region depicted in map 450 shown in FIG. 4. It can be seen that the page further includes indications 612 and 670 that there are 923 homes for sale in the Seattle city region. The map contains visual indications, such as visual indication 661-664, of neighborhood regions within the Seattle city region. Similar to FIG. 4, the borders between neighborhood regions are shown as white lines. Further, for many of the neighborhoods, the name of the neighborhood is shown, as well as the number of data home points within the neighborhood. For example, legend 661 indicates that the Belltown neighborhood region contains 19 home data points. Also, textual list 690 contains a summarized entry for each neighborhood region within the Seattle city region.

Figure 7:
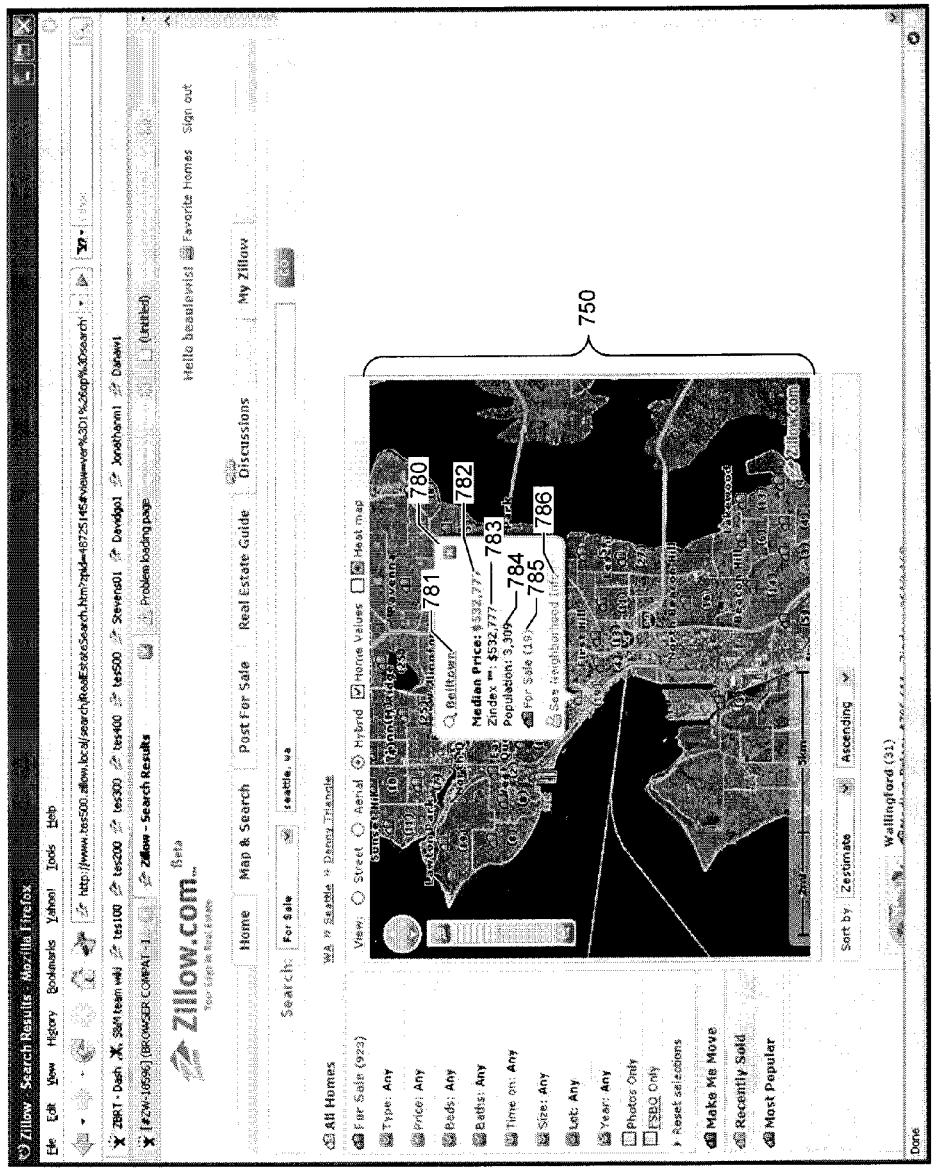
FIG. 7 is a display diagram showing a typical display generated by the facility containing additional information about the Belltown neighborhood.

FIG. 7 is a display diagram showing a typical display generated by the facility containing additional information about the Belltown neighborhood. The user may cause the facility to generate the display by, for example, clicking on legend 661 shown in FIG. 6. The map 750 includes an information bubble 780 containing information about the Belltown neighborhood region that is similar to information shown in bubble 580 in FIG. 5 for the Seattle city region.

Figure 8:
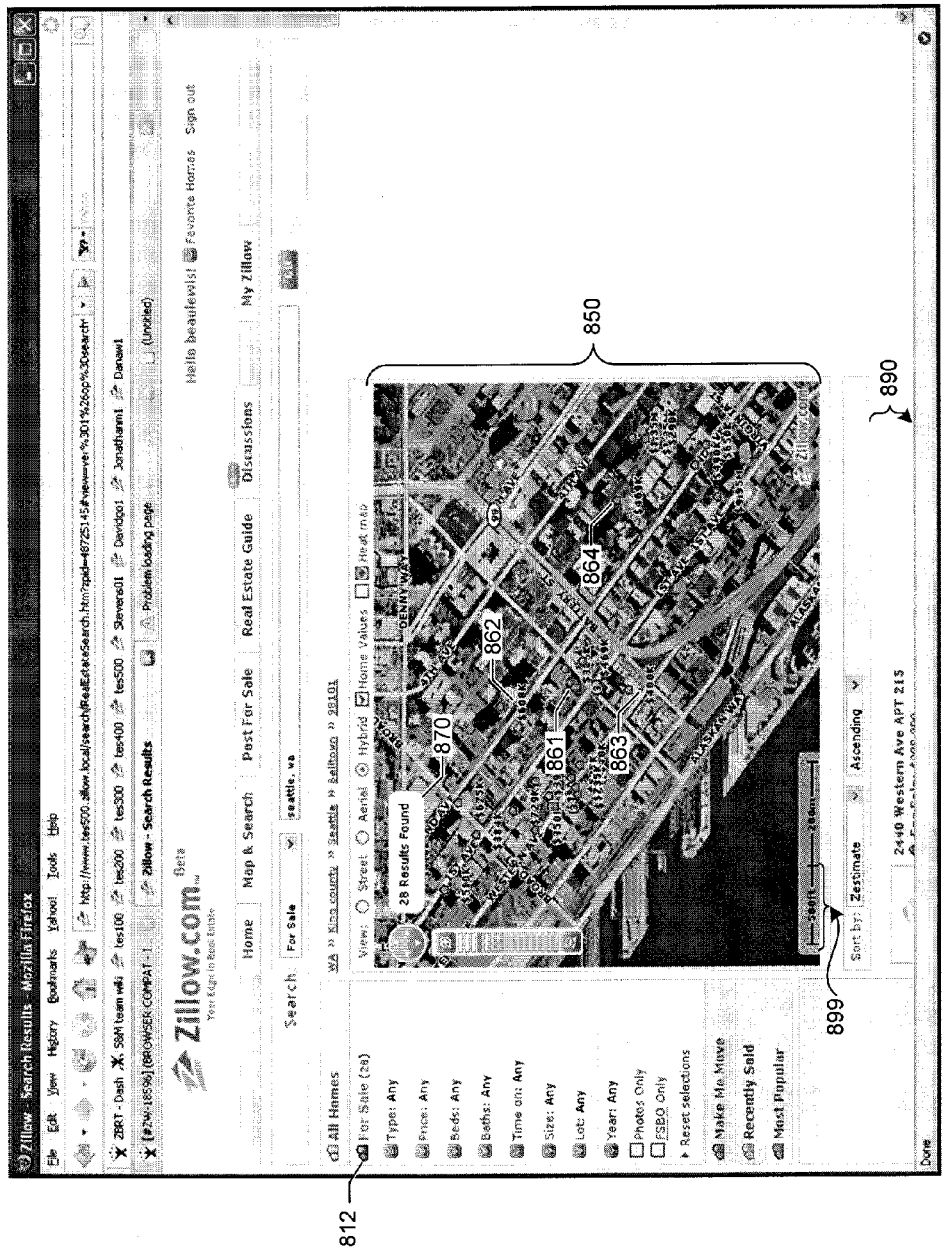
FIG. 8 is a display diagram showing a display typically presented by the facility that shows individual homes and/or buildings within the Belltown neighborhood region.

FIG. 8 is a display diagram showing a display typically presented by the facility that shows individual homes and/or buildings within the Belltown neighborhood region. The user may cause the facility to present this display by selecting control 781 shown in FIG. 7. It can be seen by comparing scale legend 899 to scale legend 699 shown in FIG. 6 that the geographic area depicted in map 850 is smaller than that depicted in map 650 shown in FIG. 6. Map 850 contains legends for individual homes and/or buildings. Indications 812 and 870 show that there are 28 home data points in this region, including those represented by legends 861-864. In the case of the legends for individual homes, such as the legends for individual homes 862-864, each showing a "house outline" shape, the listing price of the home is shown on the map. For example, the map shows a listing price of $600,000 for individual home legend 862. "Apartment building outline" legends such as legend 861 represents a multi-unit building. It can be seen from the text accompanying this legend that there are 3 homes for sale in this building. In some embodiments (not shown), the facility displays additional summary statistics in connection with multi-unit building legends, such as the median listing price of the units of the building that match the user's search criteria, the range of valuations for such units, etc. Additionally, textual list 890 contains each of the individual homes or buildings on the map. The user can select an individual home or multi-unit building legend in order to display more information about the home or the units in the multi-unit building.

Figure 9:
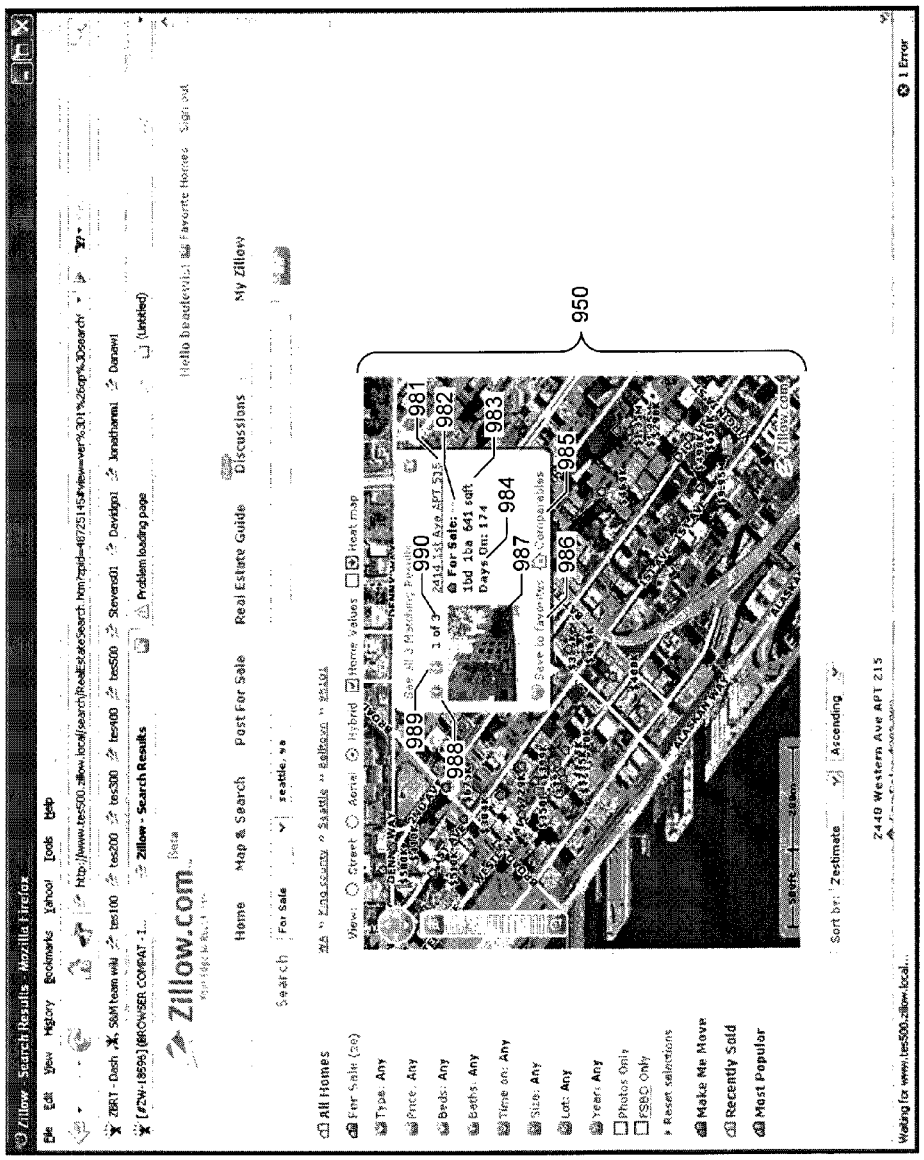
FIG. 9 is a display diagram showing a display typically presented by the facility containing additional information about one of the units that is for sale in the multi-unit building.

FIG. 9 is a display diagram showing a display typically presented by the facility containing additional information about one of the units that is for sale in the multi-unit building represented by legend 861 shown in FIG. 8. Map 950 contains an information bubble 980 positioned adjacent to the building map legend 861 that includes the following information: a control 981 that the user can select to display more information about this unit; an indication 982 that the unit is for sale; an indication 983 of attributes of the unit; an indication 984 of the number of days that have elapsed since the unit was listed for sale; a control 985 that the user may select to display a list of recent comparable sales; a control 986 that the user may select in order to save the unit to the user's list of favorite homes; an image 987 of the unit; controls 988 and 989 that the user may select in order to scroll through the list of units in the building and are for sale; an indication 990 of the for sale unit in the building whose information is shown in the bubble; a control 991 that the user may select in order to see a list of all of the for sale units in the building; and a control 992 that the user may select in order to close or dismiss the bubble.

Figure 10:
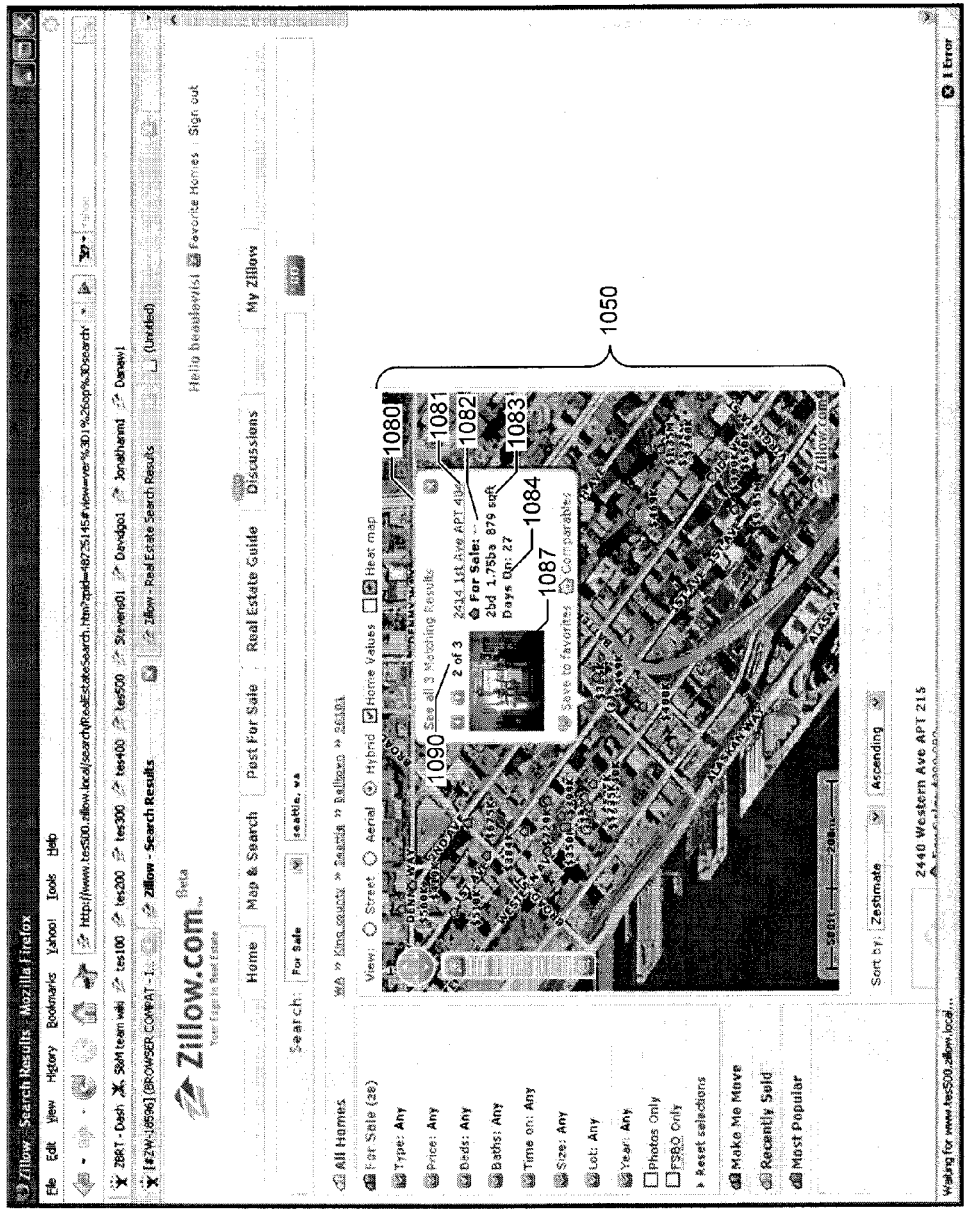
FIG. 10 is a display diagram showing a display typically presented by the facility containing additional information about a second one of the units that is for sale in the building.

FIG. 10 is a display diagram showing a display typically presented by the facility containing additional information about a second one of the units that is for sale in the building represented by building legend 861. The user may cause the facility to present this display by selecting control 989 shown in FIG. 9. The map 1050 includes an information bubble 1080 containing information about the second for sale unit in the building that is similar to the information shown in bubble 980 shown in FIG. 5 for the first unit.

As noted above, the user may filter the set of data items that are displayed and/or summarized by the facility in a variety of ways. The discussion that follows describes a variety of ways that such filtering is supported by the facility in various embodiments.

In some embodiments, the facility uses an index, sometimes referred to as a "compound index," that is specially adapted to resolving hybrid queries that specify two or more different kinds of search criteria to identify data items in a database satisfying the criteria included in the query.

For example, in some embodiments, the facility uses a compound index to resolve queries including criteria of any of the following three types: (1) textual criteria that specify textual attributes of a data item; (2) relational criteria that specify relational attributes of a data item; and (3) geographic criteria specifying geographic location attributes of a data item. In some embodiments, the compound index is made up of (1) an inverted index representing the textual attributes of each data item; (2) an indexed relational database made up of one or more tables representing the relational attributes of each data item; and (3) a geopoint table representing the geographic attributes of each data item, where item IDs that identify items in the inverted index correspond to the order of rows representing items in the tables of the relational database as well as the order of rows representing items in the geopoint table. When textual criteria from the query are applied against the inverted index, relational criteria from the query are applied to the relational database, and geographic criteria from the query are applied to the geopoint table, the resulting three constituent result sets can be joined together to form a final result set without having to first sort any of the constituent result sets, as each constituent result set is ordered in accordance with the item IDs.

In some embodiments, the facility provides a user interface that permits a user to create a query by specifying values or ranges of values (hereafter "values") for each of a number of item attributes. Some of these values are always displayed within the user interface, while others are displayed only when a drop-down menu containing them is selected by the user. Whenever a new value is specified for an attribute, the facility (1) processes a query selecting items having the specified values and/or ranges of values to obtain a result set; (2) identifies any attribute whose values are displayed but for which no value has yet been specified; (3) in a single pass through the result set, counts the number of items having each of the displayed attribute values; and (4) displays the count for each of the displayed attribute values next to the attribute value. In the case of some attributes whose values are widely-variable, the facility (5) establishes a large number of "bins" (such as 50 bins) each corresponding to a small range of values of the attribute; (6) as part of (3), for each bin, counts the number of items having a value of the attribute within the range for the bin; and (7) collapses the large number of bins to a smaller number of bins, such a four bins, each containing a roughly similar number of items and generally corresponding to larger ranges than the original bins; and (8) in (4), displays the attribute value ranges and counts for the collapsed bins. This approach provides a powerful query specification user interface while consuming reasonable quantities of computing resources.

Figure 11:
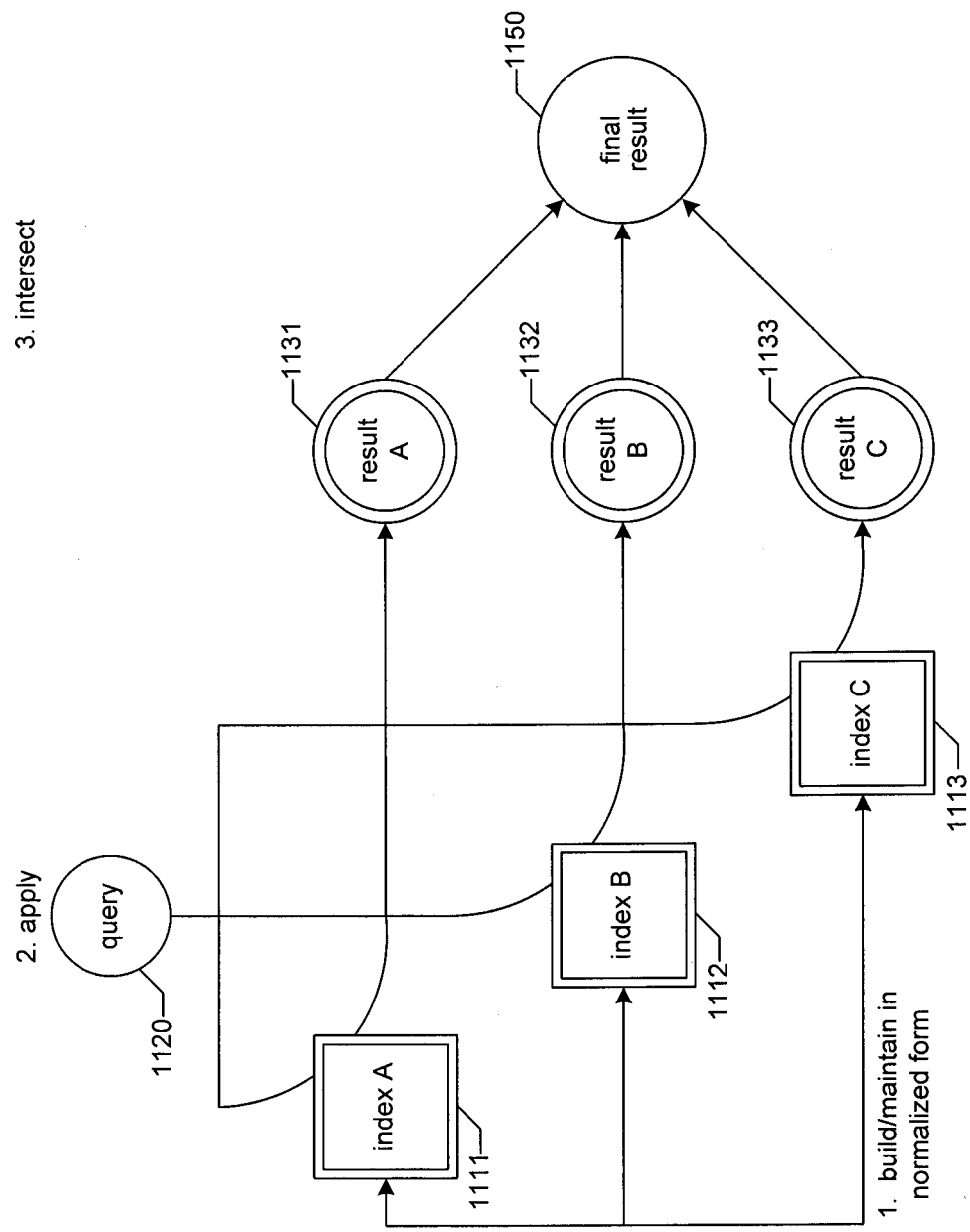
FIG. 11 is a data flow diagram showing a typical process for processing a hybrid query performed by the facility.

FIG. 11 is a data flow diagram showing a typical process for processing a hybrid query performed by the facility. First, as is shown and described further below, the facility builds and maintains each of the indices—here indices 1111-1113 in a normalized form, such as by representing the data items in the same order in each of the indices. Second, the facility applies a query 1120 received from the user against all the indices to obtain a constituent query result for each of the indices, here constituent query results 1131-1133. Because of the manner in which the indices were built and maintained, these constituent query results are already in normalized form, and it is not necessary to incur the extra cost in computing resources of sorting them. Third, the facility intersects the constituent query results to obtain a final query result 1150.

Table 3 below shows a sample data item among a set of data items searched by the facility. In this case, the sample data item contains various kinds of information about a home.

TABLE 3

| | |
|---|---|
| home id: | 20 |
| address: | 1539 NW 58th St, Seattle, WA 98107 |
| location: | 47.670820, −122.376557 |
| make me move: | No |
| for sale: | No |
| recently sold: | No |
| price: | $448,310 |
| bedrooms: | 3 |
| Bathrooms | 1 |
| size: | 1,370 sq. ft. |
| lot: | 6,453 sq. ft. |
| type: | single family |
| sale date: | Oct. 10, 1999 |
| description: | Cozy bungalow on quiet street. You'll love how the afternoon sun filters into the back yard. |

The home has an identifier of 20, and a street address as shown. The home further has a location identified by the shown latitude and longitude values. The home's make me move, for sale, and recently sold statuses are all no. The home's price is shown, as are its number of bedrooms and bathrooms, its floor area and lot size, its type and its sale date. Further, a narrative description is shown for the home.

FIGS. 12A-12C show different indices maintained on a group of home data items including the one described in Table 3. FIG. 12A is a table diagram showing a text index 1210 used to identify home data items among the set of home data items having particular words in their textual descriptions. The text index is made up of rows including shown rows 1221-1230 each representing the occurrence of a single word in the textual description of a single home, and each divided into the following columns: a term column 1211 containing the word, and a home id column 1212 containing the home id of a home data item containing the word in its textual description. For example, row 1225 indicates that the word "cozy" is contained in the textual description of the home data item having home id 20. It can been seen that the rows of the index for each word (e.g., rows 1221-1222 for the word "cottage," rows 1223-1228 for the word "cozy," and rows 1229-1230 for the word "cubbies") occur in increasing order of home id.

While FIG. 12A and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

FIG. 12B shows a geographic index 1240 maintained by the facility on the set of home data items. The geographic index is made up of rows including shown rows 1251-1255, each corresponding to a different home data item, and each divided into the following columns: a home id column containing the home id for the home data item; a latitude column 1242 containing the latitude value for the home; and a longitude column 1243 containing a longitude value for the home. For example, it can be seen that row 1253 indicates that the home data item having home id 20 has a latitude value of 47.670820 and a longitude value of −122.376557. It can be seen that the rows are ordered in increasing order of the home id column. In some embodiments, the facility maintains this order by adding each new data item to the end of the geographic index with a home id that is larger than the largest existing home id.

FIG. 12C shows a relational index 1260 used to identify home data items having particular relational values. The relational index is made up of rows such as shown rows 1281-1285, each of which corresponds to a different home data item and is divided into the following columns: a home id column 1261 containing a home id for the home; a for sale column 1262 indicating whether the home presently has a for sale status; a make me move column 1263 indicating whether the home presently has a make me move status; a recently sold column 1264 that indicates whether the home presently has a recently sold status; a price column 1265 indicating a price for the home; a beds column 1266 indicating the number of bedrooms in the home; a baths column 1267 showing the number of bathrooms in the home; a size column 1268 showing a measurement of the floor area of the home; a lot column 1269 showing a measurement of the area of the home's lot; a type column 1270 indicating the type of the home; and a sale date column 1271 indicating the last date on which the home was sold. For example, it can be seen from row 1283 that the home having home id 20 does not presently have the for sale, make me move, or recently sold properties; has a price of $348,310; has 3 bedrooms and 1 bathroom; has a floor area of 1,370 square feet and a lot size of 6,453 square feet; is a single family home; and was last sold on Oct. 10, 1999. It can be seen that the rows are ordered in increasing order of the home id. In some embodiments, the facility achieves this result by synchronizing the rows of the relational index with the rows of the geographic index shown in FIG. 12B.

Figure 13:
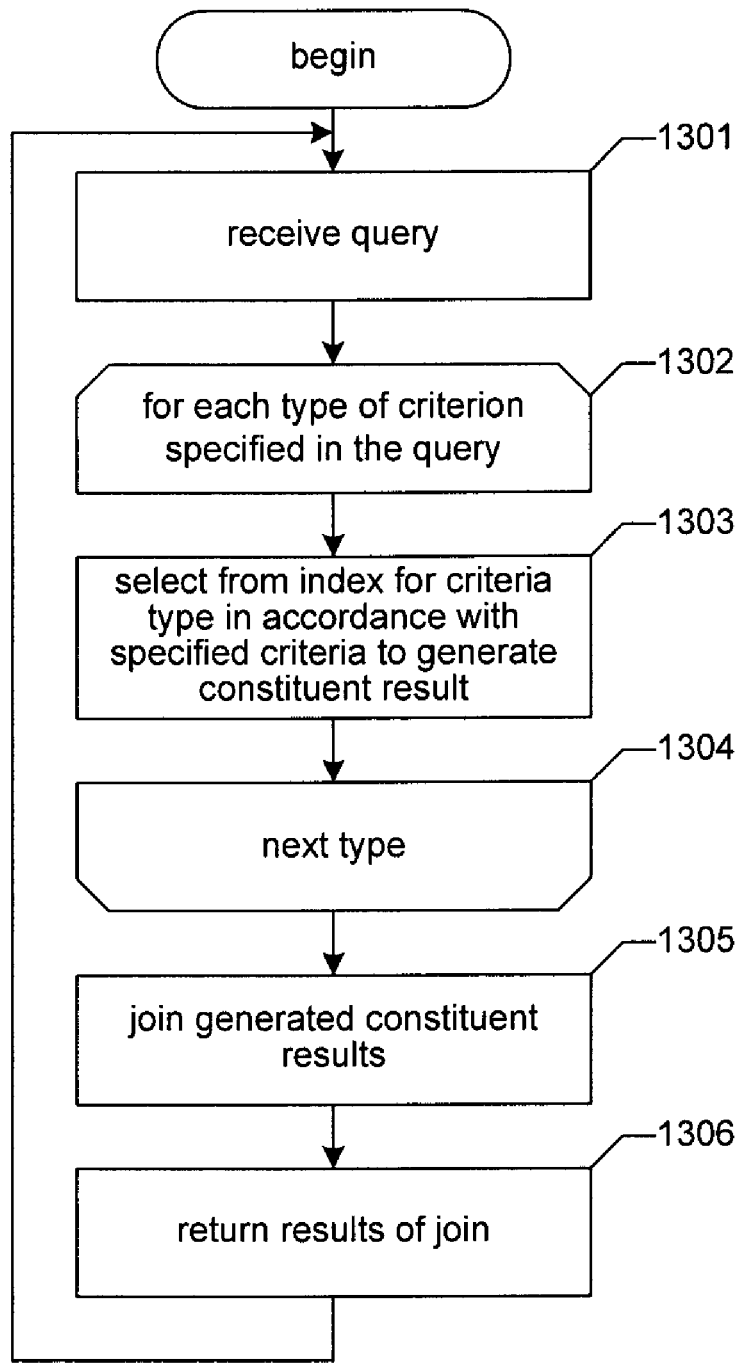
FIG. 13 is a flow diagram showing steps typically performed by the facility in order to process a hybrid query.

FIG. 13 is a flow diagram showing steps typically performed by the facility in order to process a hybrid query. In steps 1301, the facility receives the query, which specifies two or more types of criteria. An example query discussed further below is shown in Table 4.

TABLE 4

| | |
|---|---|
| Text criterion: | "cozy" |
| Geographic criteria: | latitude between 47.670750 and 47.671150; longitude between −122.376575 and −122.376490 |
| Relational criterion: | Price between $300K and $400K |

A user may specify the example query, for example, by typing the word "cozy" in a text field; selecting the price range $300K-$400K from a list of price ranges; and navigating a displayed map to show the region encompassing the specified latitude and longitude ranges.

In steps 1302-1304, the facility loops through each type of criterion specified in the query—in the sample query, the text, geographic, and relational criteria. In step 1303, the facility selects from the index for the current criteria type in accordance with the criteria of that type specified in the query to generate a constituent result. In step 1304, if additional criterion types remain to be processed, then the facility continue in steps 1302 to process the next criterion type, also the facility continues in steps 1305.

Sample constituent results generated based upon the sample query shown in Table 4 and the indices shown in FIGS. 12A-12C are shown in FIGS. 14A-14C. FIG. 14A shows a text constituent result 1410. In some embodiments, the facility generates this constituent result by reading the text index until it first encounters the term "cozy," and copying this row of the index through the last row containing the term "cozy." In some embodiments, the facility instead jumps to the first row containing the term "cozy," using an additional index on the index, not shown. It can be seen that the text constituent result contains rows 1421-1426, corresponding to all of the rows 1223-1228 contain the word "cozy" in the text index shown in FIG. 12A. It can be seen that the rows of the text constituent result are ordered in increasing order of home id as a result of having been selected from the text index ordered in the same way.

FIG. 14B shows the geographic constituent result 1430. In some embodiments, the facility generates this constituent result by reading each row of the geographic index to determine whether its latitude and longitude both fall within the range specified by the query. It can be seen that rows 1441-1446 all contain home locations within the latitude and longitude ranges specified by the query. It can further be seen that the rows of the geographic constituent result are ordered in increasing order of home id, as a result of the geographic index shown in FIG. 12B being ordered in the same manner.

FIG. 14C shows the relational constituent result 1430. In some embodiments, the facility generates this constituent result by reading each row of the relational index to determine whether its attribute values all satisfy the relational constraints of the query. It can be seen that rows 1481-1485 each correspond to a home having a price in the specified range. Here too, the rows are ordered in increasing order of home id, as a result of the relational index shown in FIG. 12C having the same order.

In step 1305, the facility joins the constituent results generated in step 1303. In step 1306, the facility returns the results of the join operation performed in step 1305 as the final result for the query received in step 1301. After step 1306, the facility continues in step 1301 to receive and process the next query.

Figure 15:
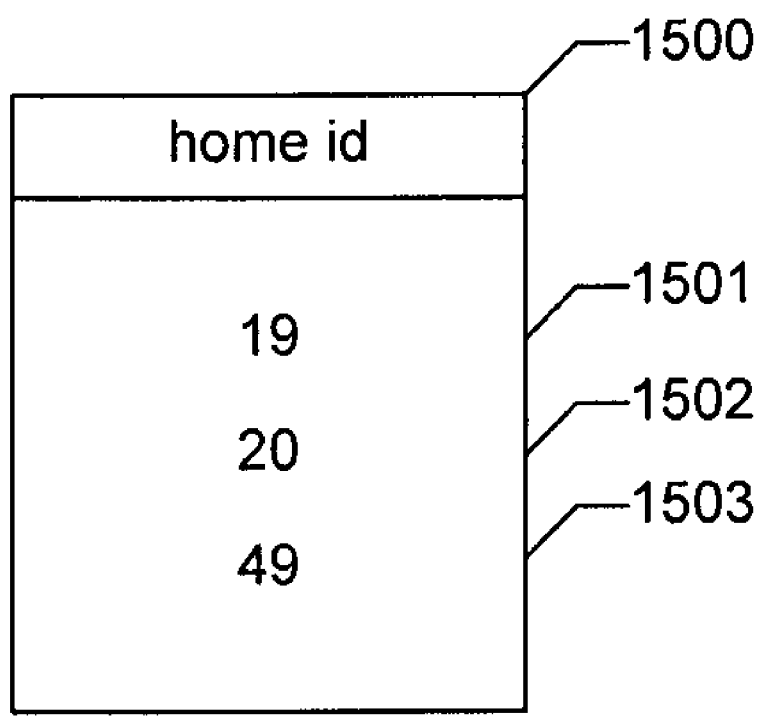
FIG. 15 a table diagram showing a final result generated by the facility for the sample query shown in Table 4 by joining the constituent results shown in FIGS. 14A-14C.

FIG. 15 a table diagram showing a final result generated by the facility for the sample query shown in Table 4 by joining the constituent results shown in FIGS. 14A-14C. It contains rows 1501-1503, containing the following home ids that are common to each of the three constituent results: 19, 20, and 49.

In some embodiments, the facility provides a user interface that permits a user to create a query by specifying values or ranges of values for each of a number of item attributes. FIGS. 16-20 show sample displays presented as part of the user interface.

Figure 16:
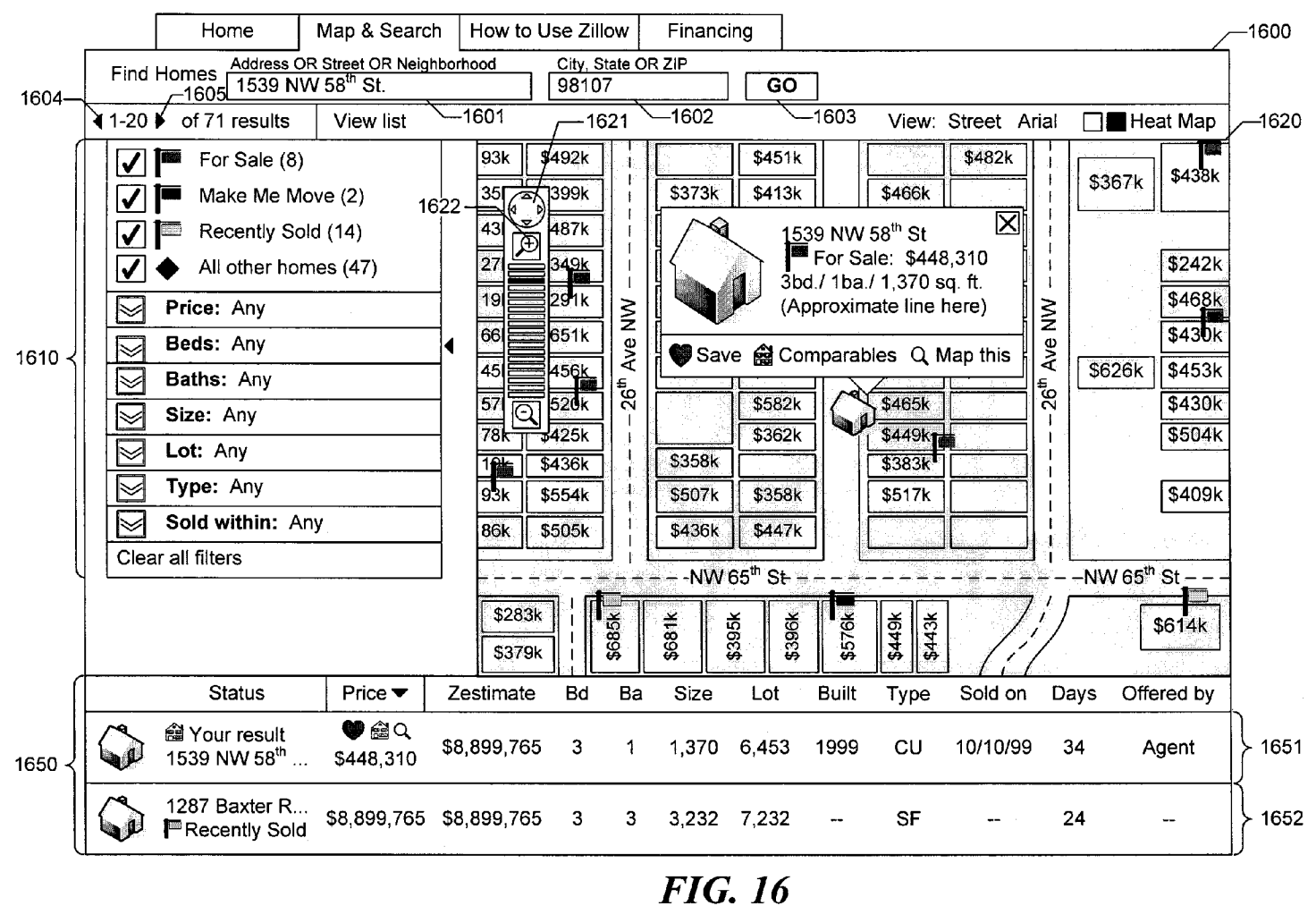

FIG. 16 is a display diagram showing an initial display of the user interface presented by the facility. The display 1600 corresponds to a search query and its result. A map 1620 has been generated for inclusion in the display based upon the user having entered the address for a home shown near the center of the map in fields 1601 and 1602, then activating button 1603. In response, the facility displayed the map 1620 that is shown, centered on the home in question at an intermediate zoom level. The borders of the map have established a geographic criterion for the search. Accordingly, the current search result is a list 1650 (only partially shown here) of all the homes that are located within the present borders of the map. The user can navigate to different pages of the query result using controls 1604 and 1605. The user may alter the geographic query criterion by navigating the map, such as by scrolling the map in a direction using control 1621, or by changing its zoom level using zoom control 1622. When the user changes the boundaries of the map in this way, the facility updates the geographic query criterion to include the present boundaries of the map, and executes the updated query to generate a new search result that includes the homes within the new boundaries. The user may also specify relational criteria for the search query using panel 1610, which is discussed in greater detail below in connection with FIGS. 17-20. Though not shown in FIG. 16, in some embodiments, the facility includes in the query specification user interface it presents a mechanism usable by the user to specify a textual criteria for the query, such as a text field.

Figure 17:
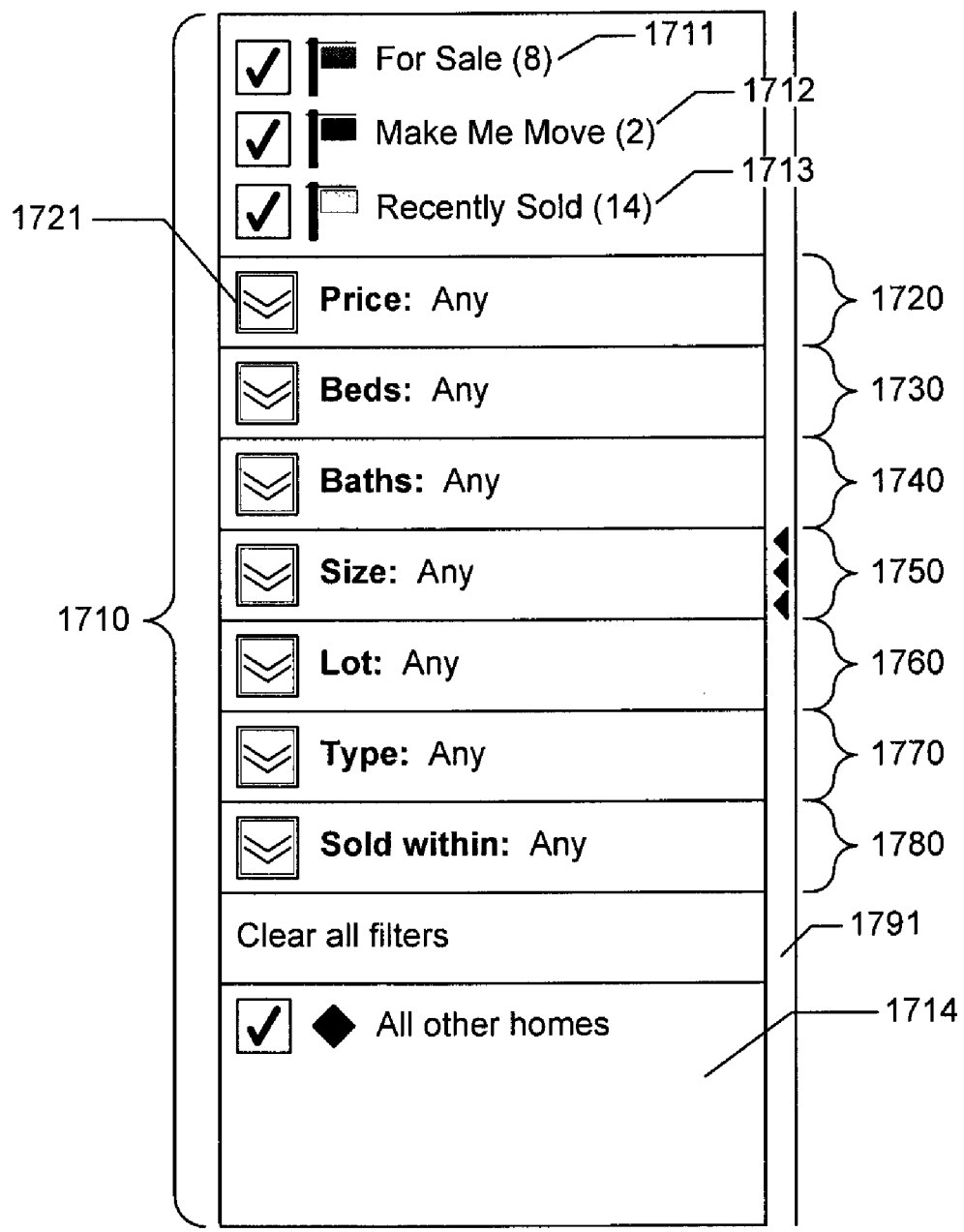

FIG. 17 is a display diagram that shows panel 1610, which is usable by the user to specify relational criteria for the query, in greater detail as panel 1710. Panel 1710 includes indications 1711-1714 of a number of different home statuses. For example, the for sale status 1711 is active for any home that is known to be presently for sale. The checkbox at the left end of the indication indicates that homes having this status are included in the search result. The parenthetical number at the right end of indication 1711 indicates that eight of the homes presently in the search result have this status. Panel 1710 further has a number of subpanels 1720, 1730, 1740, 1750, 1760, 1770, and 1780 each corresponding to a different relational attribute, which are each shown here in collapsed form. By selecting the control at the left end of one of these subpanels, the user can expand it in order to specify additional relational criteria. For example, the user may select control 1721 in order to specify a relational criterion for the query that is based upon the price attribute.

Figure 18:
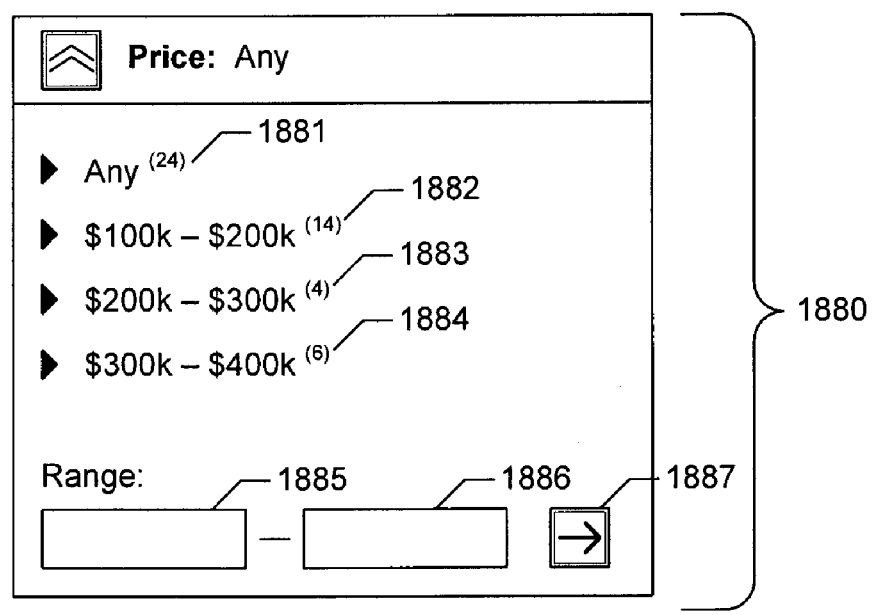

FIG. 18 is a display diagram showing an expanded version of the price attribute subpanel in the facility when the user selects control 1721. The expanded price attribute subpanel 1880 lists a number of subranges of the price attribute that may be selected by the user in order to specify a query criterion for the price attribute. A first indication 1881 may be selected by the user to collapse subpanel 1880 without specifying a subrange of the price attribute for inclusion in the query. On the other hand, the user may select any of indications 1882-1884 in order to specify a query criterion for the displayed range. For example, the user may select indication 1884 in order to add to the query a criterion requiring a price attribute to be between $300 k and $400 k. The parenthetical at the right end of this indication indicates that, among the homes contained in the current query result, six of them fall into this range and would satisfy such a criterion. The user may also enter a custom range into fields 1885 and 1886, and select control 1887 in order to create a query criterion for the custom range.

Figure 19:
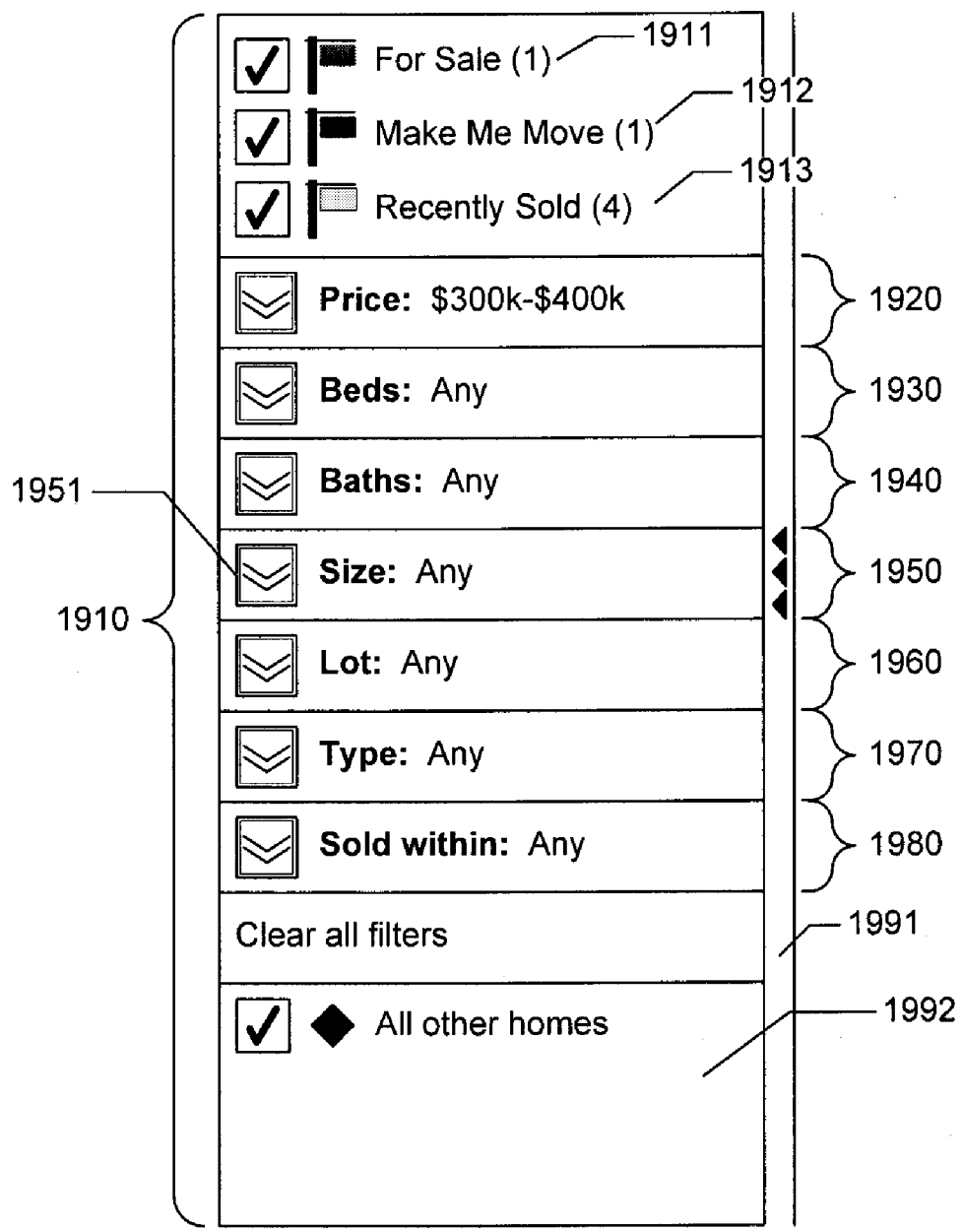

FIG. 19 is a display diagram that shows panel 1910 after the user has selected indication 1884 in FIG. 18. By comparing FIG. 19 to FIG. 17, it can be observed that the facility has updated the counts displayed for each of statuses 1911-1913 shown in the panel to reflect the number of homes having these statuses in the query result for the updated query containing the price criterion specified by the user in selecting indication 1884. Additionally, it can be seen that collapsed price subpanel 1920 now contains an indication that this attribute has been constrained to the specified range. The user may go on to specify additional criteria, or select the clear all filters control 1991 to delete the existing relational criterion from the query.

Figure 20:
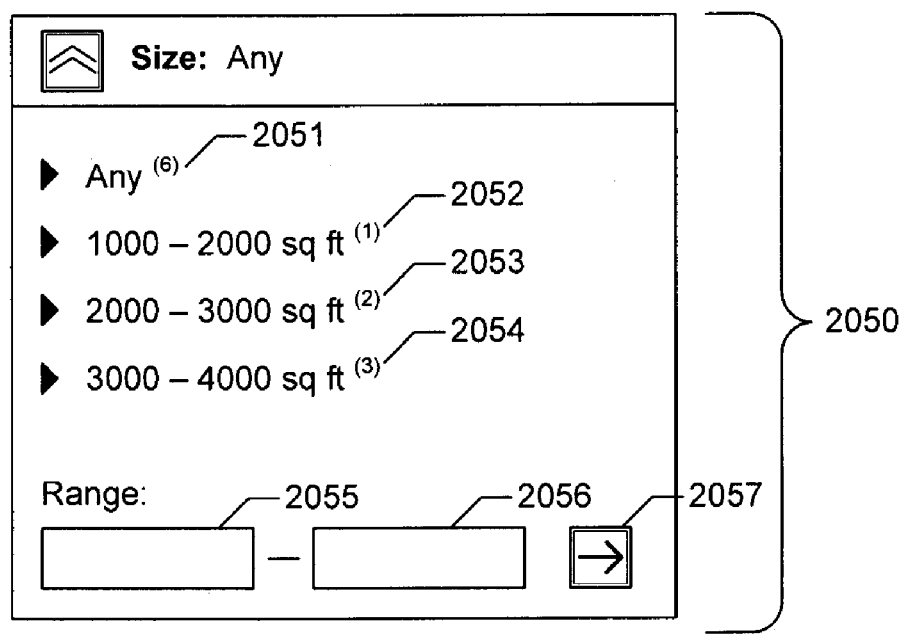

FIG. 20 shows a sample display presented by the facility when the user goes on to select control 1951 to expand the collapsed size subpanel 1950. The expanded subpanel 2050 contains ranges for the size attribute and an indication for each range of the number of homes in the current query result that fall into each subrange. For example, indication 2053 shows that two homes in the current search result have a size attribute value between two thousand and three thousand square feet. Again, the user may make a selection in expanded size panel 2050 to add to the query another relational criterion specifying a particular subrange for the size attribute.

Figure 21:
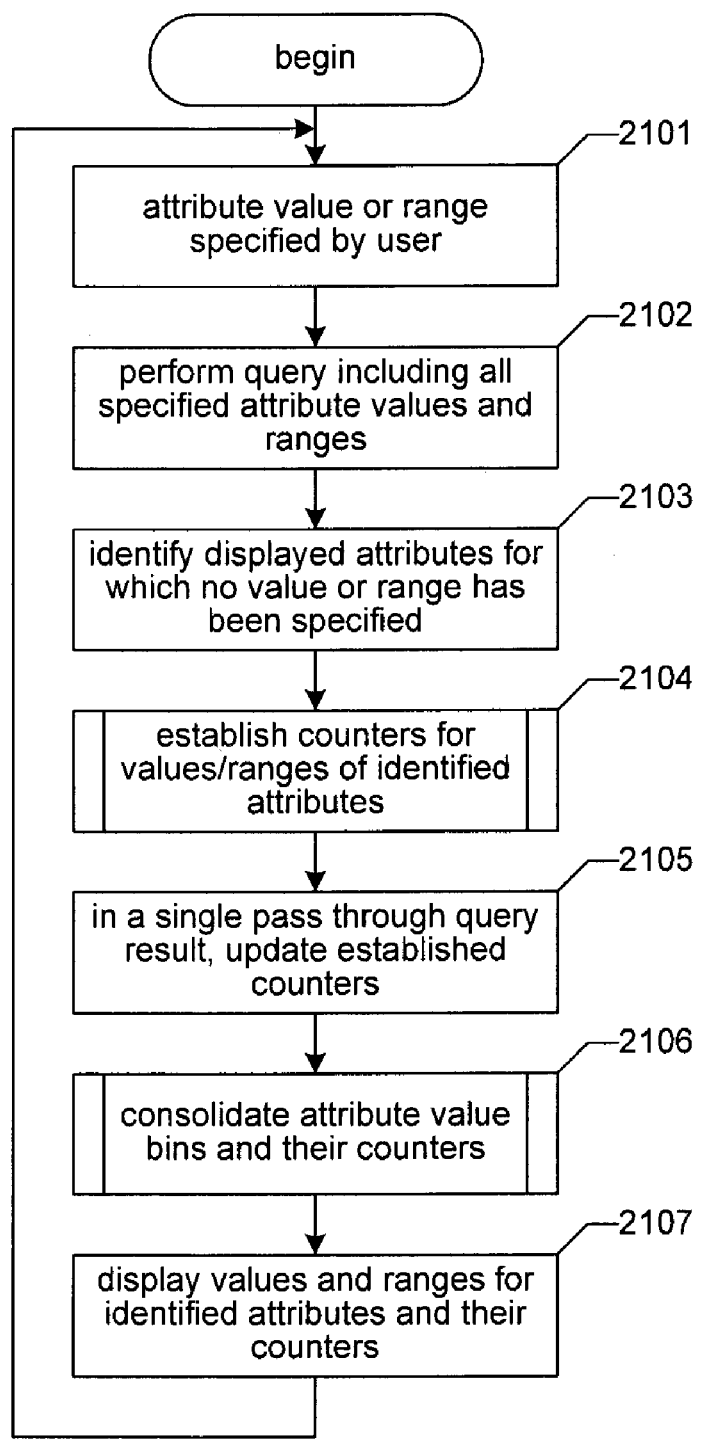
FIGS. 21-23 are flow diagrams showing steps typically performed by the facility in order to present the query specification user interface described above.

FIG. 21 is a flow diagram that shows steps typically performed by the facility in order to present the query specification user interface described above. In step 2101, the facility receives the specification of an attribute value or range from the user, such as is described above in connection with FIGS. 16, 18, and 20. In step 2102, the facility performs a query that includes any attribute values and ranges specified by the user. In step 2103, the facility identifies attributes that are or can be displayed for which the user has specified no value or range. In step 2104, the facility establishes counters for values or ranges of identified attributes.

Figure 22:
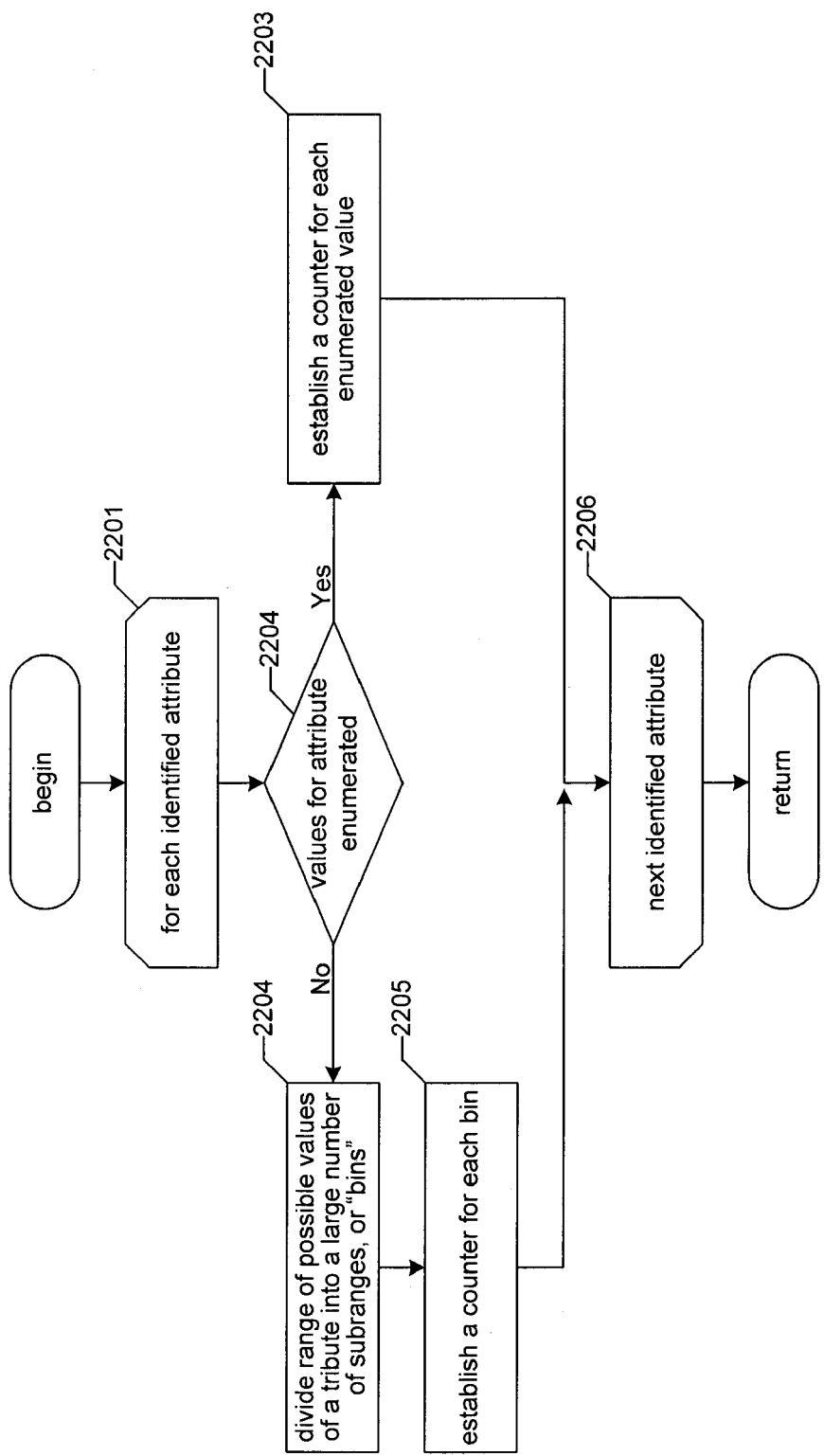

FIG. 22 is a flow diagram showing additional details of step 2104. In steps 2201-2206, the facility loops through each attribute identified in step 2103. In step 2202, if the values for this attribute are enumerated (e.g., yes/no, or condominium/ single family), then the facility continues in step 2203, else (e.g., for price, size, etc., attributes), the facility continues in step 2204. In step 2203, the facility establishes a counter for each enumerated value of the attribute. After step 2203, the facility continues in step 2206.

In step 2204, the facility divides the range of possible values for the attribute into a large number of subranges, also called "bins." As one example, the facility may establish 101 subranges for the price attribute: 100 $20,000-wide subranges between zero and $2,000,000, and a subrange over $2,000,000. In step 2205, the facility establishes a counter for each bin established in step 2204. In step 2206, if additional identified attributes remain to be processed, then the facility continues in step 2201 to process the next identified attribute, else the facility returns.

Returning to FIG. 21, in step 2105, in a single pass through the query result generated in step 2102, the facility updates all of the counters established in step 2104. In step 2106, the facility consolidates attribute value bins and their counters in order to be able to display a reasonable number of subranges.

Figure 23:
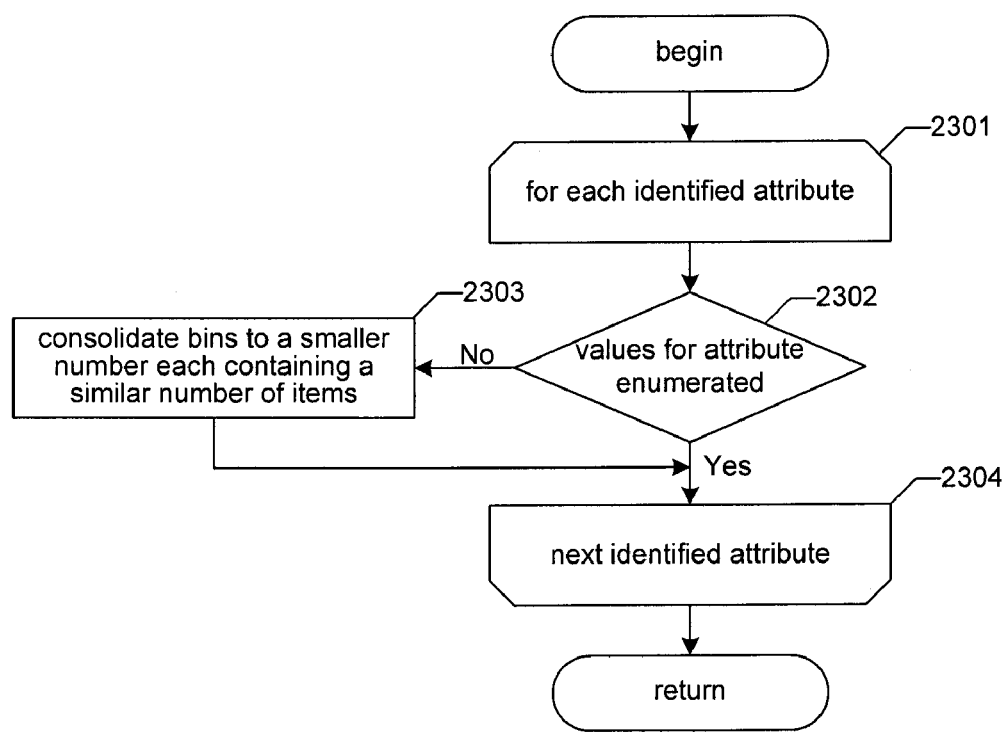

FIG. 23 is a flow diagram showing details of step 2106. In steps 2301-2304, the facility loops through each attribute identified in step 2103. In step 2302, if the values for this attribute are enumerated, then the facility continues in 2304, else the facility continues in step 2303. In step 2303, the facility consolidates the bins established for the attribute for a smaller number of bins, each containing a similar number of items. For example, from the 101 bins established for the price attribute, the facility may form four consolidated bins, each containing approximately one quartile of the homes counted among all 101 original bins. In step 2304, if additional identified attributes remain to be processed then the facility continues in step 2301 to process the next identified attribute, else the facility returns.

Returning to FIG. 21, in step 2107, the facility displays the values and ranges for the identified attributes and their counters as shown in FIGS. 19 and 20.

It will be appreciated by those skilled in the art that the above-described facility may be straightforwardly adapted or extended in various ways. For example, the facility may use a variety of approaches to determine which summarization level to use for a particular request. Also, the facility may use any of a large number of techniques to summarize multiple data points that are present within a region. Further, data points may be of virtually any type, so long as each is associated with a particular geographic location. While the foregoing description makes reference to particular embodiments, the scope of the invention is defined solely by the claims that follow and the elements recited therein.

We claim:

1. A method in a computing system having a processor for displaying information about homes, comprising:
    causing to be displayed to a user a control for selecting a geographic area;
    causing to be displayed to the user a control for selecting home attribute values of at least one home attribute;
    in response to the selection of a geographic area and home attribute values using the displayed controls:
    obtaining a map of the selected geographic area;
    among a plurality of summarization levels each corresponding to a different region type, selecting a summarization level best-suited to the selected geographic area;
    with the processor, identifying a plurality of regions of the region type to which the selected summarization level corresponds that intersect the selected geographic area;
    for each of the identified regions:
        with the processor, identifying a plurality of homes that each have the selected home attribute values and that are each within the identified region;
        with the processor, for a distinguished home attribute, aggregating across the identified homes the values for the identified homes of the distinguished home attribute to obtain an aggregated home attribute value that describes the identified homes without expressly specifying the value of the distinguished home attribute for each of the identified homes;

annotating the identified region in the obtained map with the aggregated home attribute value; and causing the map in which each of the identified regions is annotated to be displayed to the user.

2. The method of claim 1, further comprising, in response to the user's selection of one of the identified regions, repeating the method using the selected identified region as the selected geographic area.

3. The method of claim 1, further comprising, in response to the user's selection of one of the identified regions, causing to be displayed additional information about the selected identified region.

4. The method of claim 3 wherein the additional information about the selected identified region is displayed proximate to the selected identified region in the displayed map.

5. The method of claim 1, further comprising, before causing the annotated map to be displayed to the user, adding to the annotated map borders between the identified regions.

6. The method of claim 1 wherein the control for selecting a geographic area responds to panning and zooming instructions.

7. The method of claim 1 wherein the control for selecting a geographic area enables the user to enter the name of a geographic region to which the selected geographic area corresponds.

8. The method of claim 1 wherein the control for selecting a geographic area enables the user to enter an address within the selected geographic area.

9. A storage device storing contents that are adapted to cause a computing system to perform a method for displaying information about homes, the method comprising:

causing to be displayed to a user one or more controls for selecting a geographic area and selecting home attribute values of at least one home attribute;

in response to the selection of a geographic area and home attribute values using the displayed controls:

among a plurality of summarization levels each corresponding to a different region type, selecting a summarization level best-suited to the selected geographic area;

identifying a plurality of regions of the region type to which the selected summarization level corresponds that intersect the selected geographic area;

for each of the identified regions:

identifying a plurality of homes that each have the selected home attribute values that are each within the identified region;

for a distinguished home attribute, aggregating across the identified homes the values for the identified homes of the distinguished home attribute to obtain an aggregated home attribute value that describes the identified homes without expressly specifying the value of the distinguished home attribute for each of the identified homes;

annotating the identified region in a map of the selected geographic area with the aggregated home attribute value; and causing the map in which each of the identified regions is annotated to be displayed to the user.

10. The storage device of claim 9, the method further comprising, in response to the user's selection of one of the identified regions, repeating the method using the selected identified region as the selected geographic area.

11. The storage device of claim 9, the method further comprising, in response to the user's selection of one of the identified regions, causing to be displayed additional information about the selected identified region.

12. The storage device of claim 1 wherein the additional information about the selected identified region is displayed proximate to the selected identified region in the displayed map.

13. The storage device of claim 9, the method further comprising, before causing the annotated map to be displayed to the user, adding to the annotated map borders between the identified regions.

14. The storage device of claim 9 wherein the control for selecting a geographic area responds to panning and zooming instructions.

15. The storage device of claim 9 wherein the control for selecting a geographic area enables the user to enter the name of a geographic region to which the selected geographic area corresponds.

16. The storage device of claim 9 wherein the control for selecting a geographic area enables the user to enter an address within the selected geographic area.

17. An apparatus, comprising:

a display subsystem that causes to be displayed to a user a control for selecting a geographic area, a control for selecting home attribute values of at least one home attribute, and an annotated map; and an annotation subsystem that, in response to the selection of a geographic area and home attribute values using the controls caused to be displayed by the display subsystem:

obtains a map of the selected geographic area;

among a plurality of summarization levels each corresponding to a different region type, selects a summarization level best-suited to the selected geographic area;

identifies a plurality of regions of the region type to which the selected summarization level corresponds that intersect the selected geographic area;

for each of the identified regions:

identifies a plurality of homes that each have the selected home attribute values and that are each within the identified region;

for a distinguished home attribute, aggregates across the identified homes the values for the identified homes of the distinguished home attribute to obtain an aggregated home attribute value that describes the identified homes without expressly specifying the value of the distinguished home attribute for each of the identified homes; and annotates the identified region in the obtained map with the aggregated home attribute value, such that, in the annotated map displayed by the display subsystem, each of the identified regions is annotated.

* * * * *

UNITED STATES PATENT AND TRADEMARK OFFICE
CERTIFICATE OF CORRECTION

| | | |
|---|---|---|
| PATENT NO. | : 8,095,434 B1 | Page 1 of 1 |
| APPLICATION NO. | : 12/031436 | |
| DATED | : January 10, 2012 | |
| INVENTOR(S) | : Randy W. Puttick et al. | |

It is certified that error appears in the above-identified patent and that said Letters Patent is hereby corrected as shown below:

IN THE DRAWINGS:

On sheet 2 of 24, in Figure 2, below Reference Numeral 202, line 1, delete "202" and insert -- 203 --, therefor.

IN THE SPECIFICATIONS:

In column 2, line 39, delete "uses" and insert -- users --, therefor.

In column 12, line 3, delete "join" and insert -- joint --, therefor.

IN THE CLAIMS:

In column 16, line 9, in claim 12, delete "claim 1" and insert -- claim 11 --, therefor.

Signed and Sealed this
Tenth Day of April, 2012

David J. Kappos
*Director of the United States Patent and Trademark Office*